(12) United States Patent
Sodhi et al.

(10) Patent No.: US 8,819,461 B2
(45) Date of Patent: Aug. 26, 2014

(54) METHOD, APPARATUS, AND SYSTEM FOR ENERGY EFFICIENCY AND ENERGY CONSERVATION INCLUDING IMPROVED PROCESSOR CORE DEEP POWER DOWN EXIT LATENCY BY USING REGISTER SECONDARY UNINTERRUPTED POWER SUPPLY

(75) Inventors: Inder M. Sodhi, Folsom, CA (US); Alon Naveh, Ramat Hasharon (IL); Michael Zelikson, Haifa (IL); Sanjeev s. Jahagirdar, Folsom, CA (US); Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 13/335,880

(22) Filed: Dec. 22, 2011

(65) Prior Publication Data

US 2012/0166852 A1    Jun. 28, 2012

(51) Int. Cl.
*G06F 1/00* (2006.01)

(52) U.S. Cl.
USPC ........... 713/320; 713/300; 713/310; 713/322; 713/323

(58) Field of Classification Search
USPC .......................... 713/300, 310, 320, 322, 323
See application file for complete search history.

(56) References Cited

U.S. PATENT DOCUMENTS

| 7,664,970 | B2 | 2/2010 | Jahagirdar et al. | |
|---|---|---|---|---|
| 7,880,284 | B2 | 2/2011 | Zelikson et al. | |
| 7,917,787 | B2 | 3/2011 | Jahagirdar et al. | |
| 7,953,993 | B2 | 5/2011 | Allarey et al. | |
| 2003/0101362 | A1* | 5/2003 | Dia | 713/300 |
| 2008/0072088 | A1* | 3/2008 | Allarey et al. | 713/324 |
| 2009/0204837 | A1* | 8/2009 | Raval et al. | 713/330 |
| 2012/0054549 | A1* | 3/2012 | Kwan et al. | 714/36 |
| 2012/0110353 | A1* | 5/2012 | Ehrlich et al. | 713/300 |

* cited by examiner

*Primary Examiner* — Kim Huynh
*Assistant Examiner* — Zahid Choudhury
(74) *Attorney, Agent, or Firm* — Blakely, Sokoloff, Taylor & Zafman LLP

(57) ABSTRACT

Embodiments of the invention relate to improving exit latency from computing device processor core deep power down. Processor state data may be maintained during deep power down mode by providing a secondary uninterrupted voltage supply to always on keeper circuits that reside within critical state registers of the processor. When these registers receive a control signal indicating that the processor power state is going to be reduced from an active processor power state to a zero processor power state, they write critical state data from the critical state register latches to the keeper circuits that are supplied with the uninterrupted power. Then, when a register receives a control signal indicating that a processor power state of the processor is going to be increased back to an active processor power state, the critical state data stored in the keeper circuits is written back to the critical state register latches.

20 Claims, 16 Drawing Sheets

FIG. 7
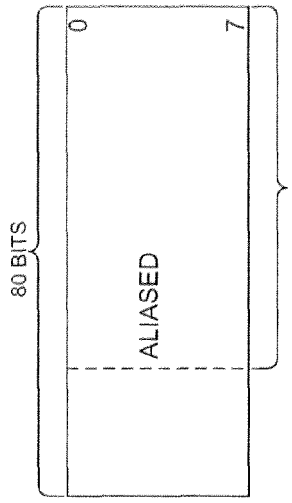
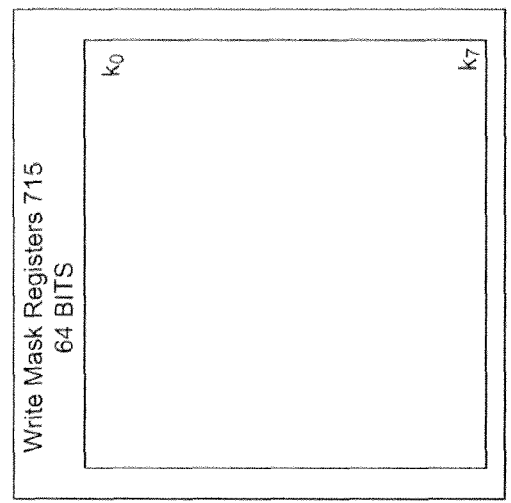
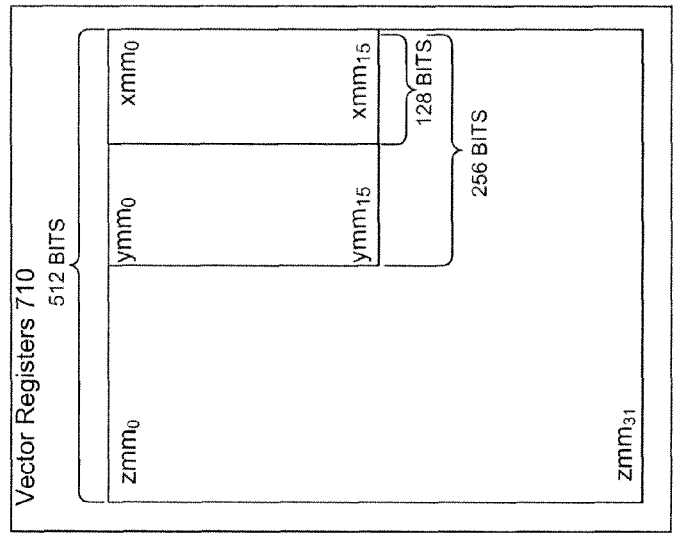

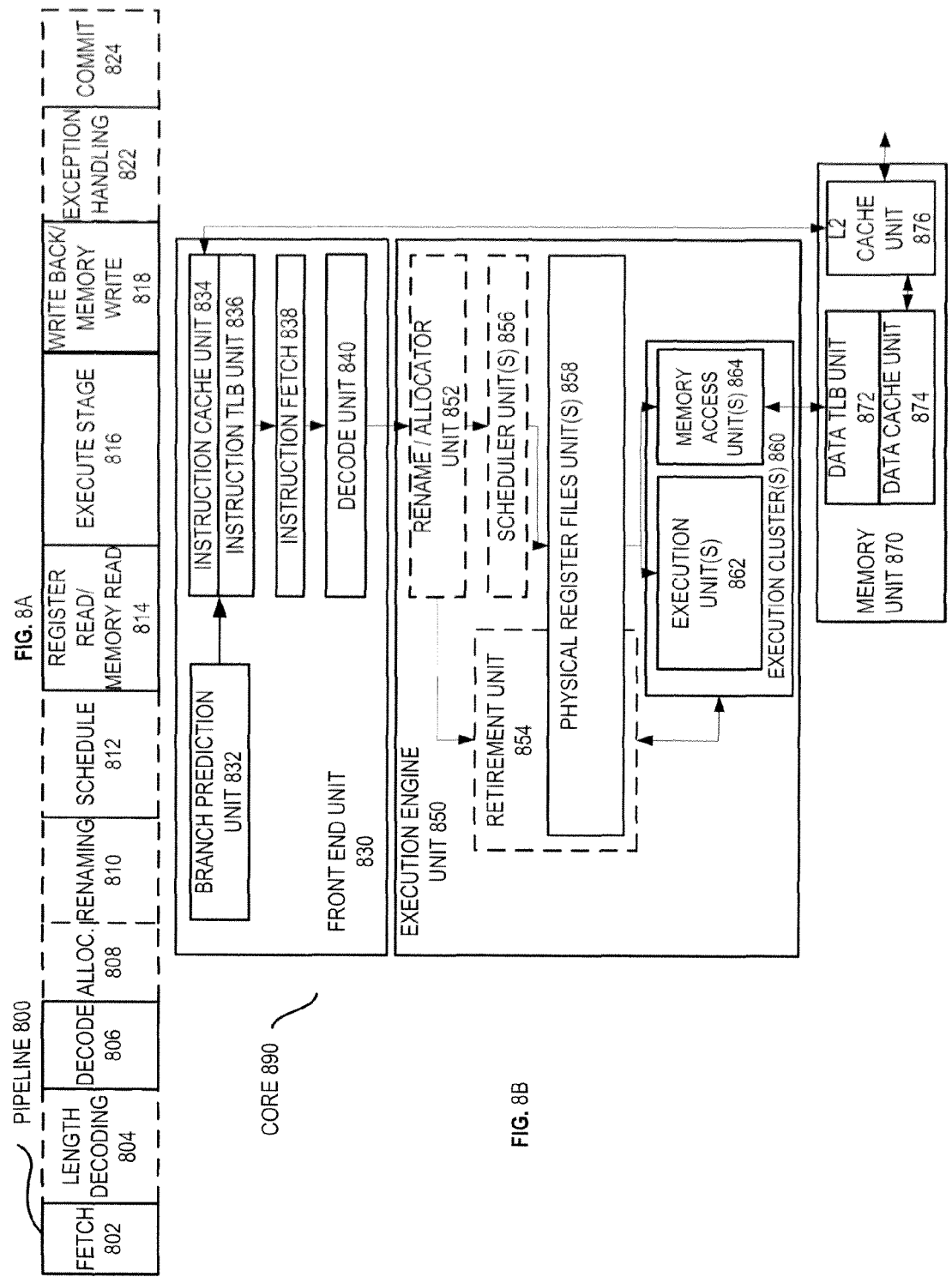

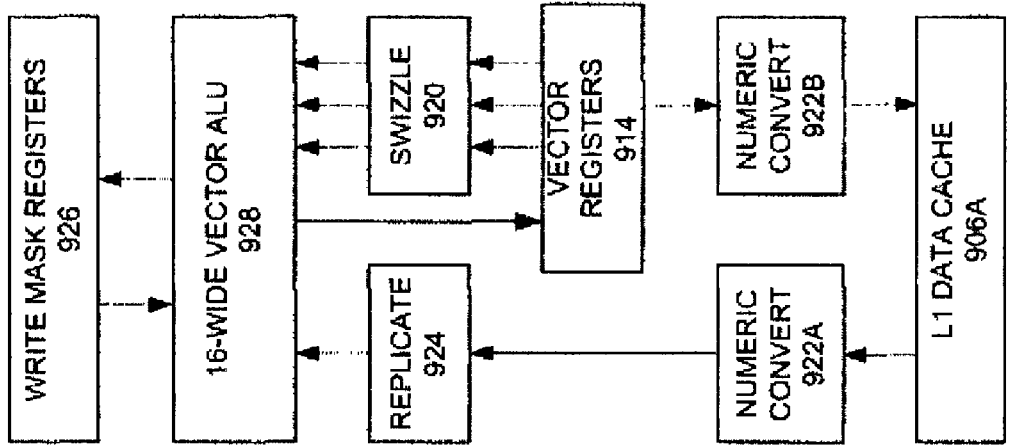
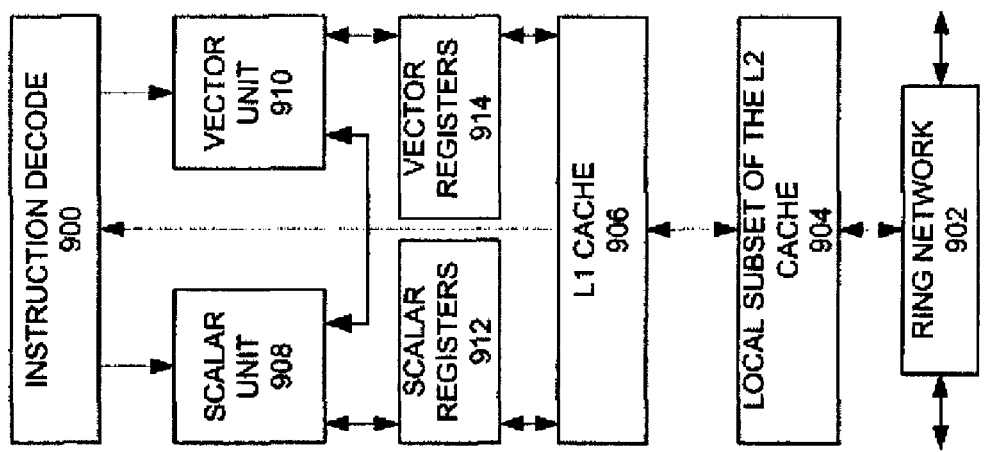

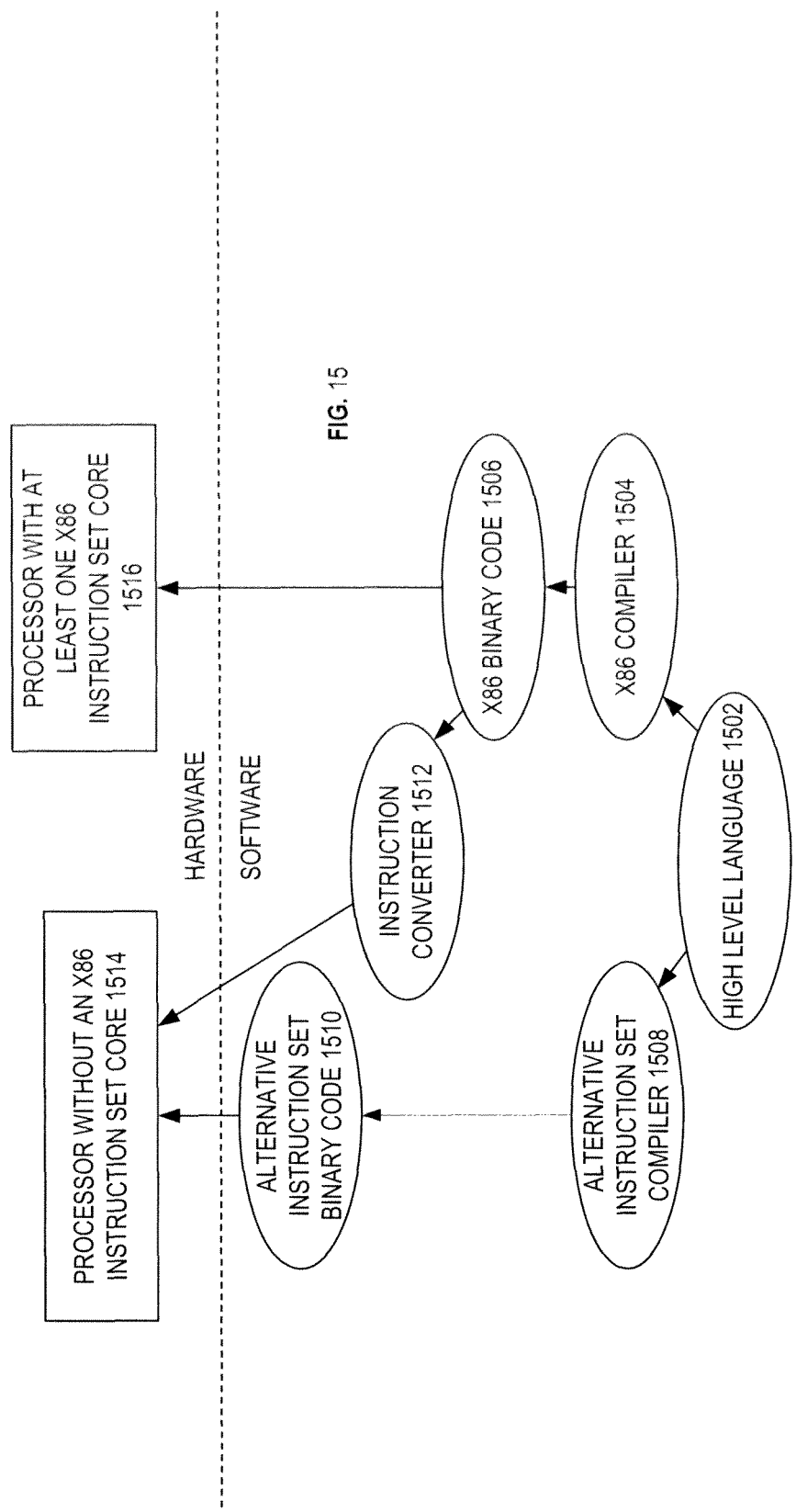

METHOD, APPARATUS, AND SYSTEM FOR ENERGY EFFICIENCY AND ENERGY CONSERVATION INCLUDING IMPROVED PROCESSOR CORE DEEP POWER DOWN EXIT LATENCY BY USING REGISTER SECONDARY UNINTERRUPTED POWER SUPPLY

FIELD

This disclosure pertains to energy efficiency and energy conservation in integrated circuits, as well as code to execute thereon, and in particular but not exclusively, to the field of maintaining processor state data during deep power down mode of computing device processors. More particularly, embodiments of the invention relate to energy efficient and energy conserving improved processor core deep power down exit latency by using secondary uninterrupted power supplied to state registers of the processor.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

As the trend toward advanced microprocessors, e.g. central processing units (CPUs) or "processors", with more transistors and higher frequencies continues to grow, computer designers and manufacturers are often faced with corresponding increases in power and energy consumption. Particularly in computing devices, processor power consumption can lead to overheating, which may negatively affect performance, waste energy, damage the environment, and can significantly reduce battery life. In addition, because batteries typically have a limited capacity, running the processor of a mobile device more than necessary could drain the capacity more quickly than desired. Moreover, processor power consumption can be more efficiently controlled to increase energy efficiency and conservation associated with integrated circuits (e.g., the processor).

Thus, power consumption continues to be an important issue for computing devices including desktop computers, servers, laptop computers, wireless handsets, cell phones, tablet computers, personal digital assistants, etc. In today's computing devices, for example, to address power dissipation concerns, certain components may be placed into lower power sleep states based on reduced activity or demand.

For one approach, an operating system may support a built-in power management software interface such as Advanced Configuration and Power Interface (ACPI) specification (for example, ACPI Specification, Revision 4.0a, published on Apr. 5, 2010 . . . Rev. 3.0, Sep. 2, 2004; Rev. 2.0c, Aug. 25, 2003; Rev. 2.0, Jul. 27, 2000, etc.). ACPI describes a power management policy including various "C states" that may be supported by processors and/or chipsets. For this policy, C0 is defined as the Run Time state in which the processor operates at high voltage and high frequency. C1 is defined as the Auto HALT state in which the core clock is stopped internally. C2 is defined as the Stop Clock state in which the core clock is stopped externally. C3 is defined as a Deep Sleep state in which all processor clocks are shut down, and C4 is defined as a Deeper Sleep state in which all processor clocks are stopped and the processor voltage is reduced to a lower data retention point. C5 is a Deeper Sleep state in which the processor voltage is reduced to near zero, but some components remain powered so the computer can "wake" from input from the keyboard, clock, modem, LAN, or USB device. C6 is a Deeper Sleep state known as the zero, near zero, or voltage sleep state.

BRIEF DESCRIPTION OF THE DRAWINGS

FIG. 7 is a block diagram of a register architecture according to one embodiment of the invention.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIGS. 9A-B illustrate a block diagram of a more specific exemplary in-order core architecture, which core would be one of several logic blocks (including other cores of the same type and/or different types) in a chip.

FIG. 15 is a block diagram contrasting the use of a software instruction converter to convert binary instructions in a source instruction set to binary instructions in a target instruction set according to embodiments of the invention.

DETAILED DESCRIPTION

Figure 1:
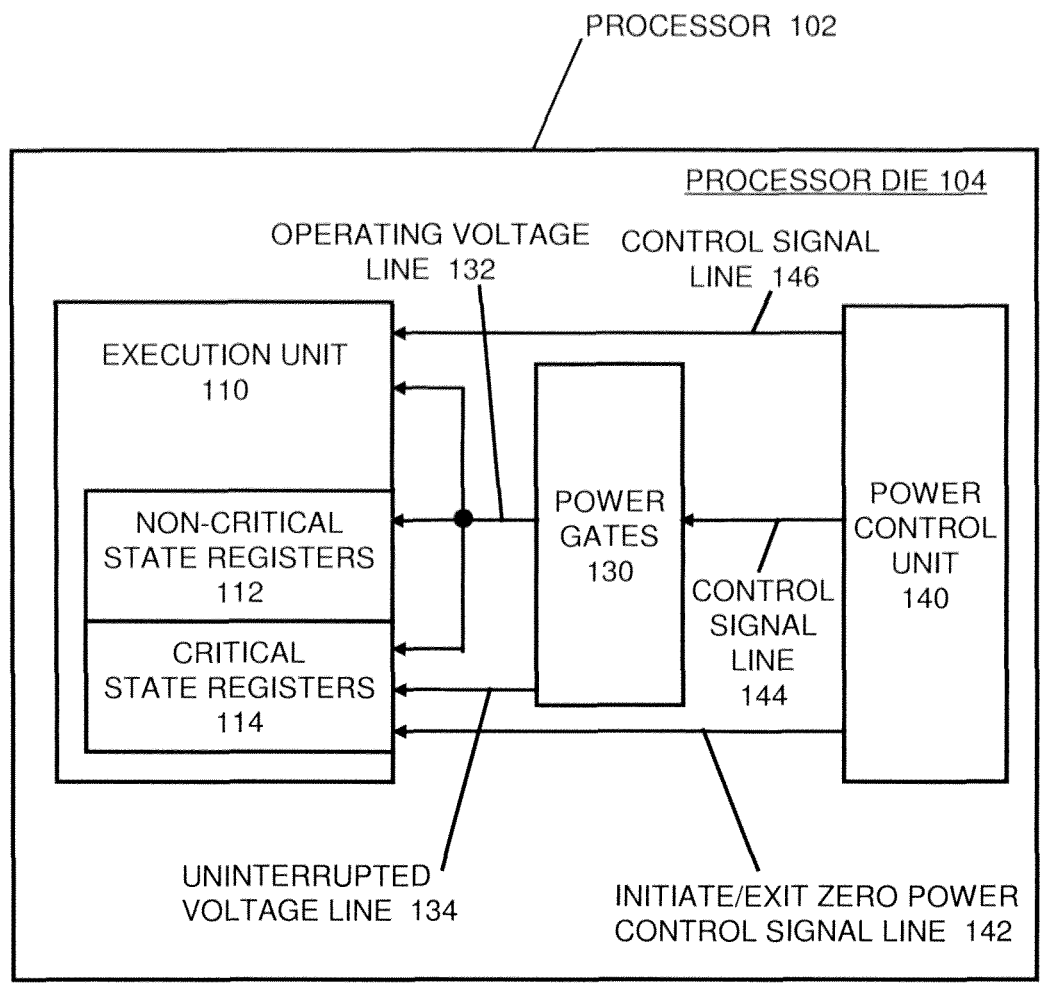
FIG. 1 is a block diagram of a processor that may be used to implement improved processor core deep power down exit latency by using secondary uninterrupted power supplied to state registers of the processor, according to some embodiments of the present invention.

In the following description, the various embodiments of the invention will be described in detail. However, such details are included to facilitate understanding of the embodiments of the invention and to describe exemplary embodiments for employing the embodiments of the invention. Such details should not be used to limit the embodiments of the invention to the particular embodiments described because other variations and embodiments are possible while staying within the scope of the embodiments of the invention. Furthermore, although numerous details are set forth in order to provide a thorough understanding of the embodiments of the invention, it will be apparent to one skilled in the art that these specific details are not required in order to practice the embodiments of the invention.

In the following description, particular components, circuits, state diagrams, software modules, systems, timings, etc. are described for purposes of illustration. It will be appreciated, however, that other embodiments are applicable to other types of components, circuits, state diagrams, software modules, systems, and/or timings, for example. Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Power consumption continues to be an important issue for computing devices including desktop computers, servers, laptop computers, wireless handsets, cell phones, tablet computers, personal digital assistants, etc. In today's computing devices, for example, to address power dissipation concerns, certain components, such as a processor or components thereof, may be placed into lower power sleep states based on avoiding overheating, reduced activity or reduced demand. Such reduction may include reducing the processor power state to a "deep power down mode", such as a zero voltage processor state (e.g., C6, "deep sleep" or "off" state) to provide more energy efficiency and power conservation.

However, when a processor is put into a deep power down mode, it is desirable to store the processor state so that the processor can return to the proper state (e.g., the state prior to deep down power mode) and begin to process data again. Thus, existing deeper sleep states for some processors still burn a non-negligible amount of power because voltage is still required to store the processor state, and that power cannot be completely powered off. For example, state variables associated with the processor (e.g., the processor's current or most recent processing state) may be saved in a dedicated cache or volatile memory (e.g., synchronous random access memory—SRAM). Storing the state variables in such a memory requires transferring the state variable data from state registers to the memory prior to deep power down mode, and then transferring the state variable data from the memory, back to the state registers, after the deep power down mode. This process may suffer undesired power usage and latency when transferring the state variable data from, and back to the state registers, because the SRAM is a memory separate from the state registers of the processor.

Consequently, when the processor is entering a deep power down mode, it may be desirable to reduce entry latency related to storing the processor state so that the processor can more quickly enter the deep down power mode. In addition, when the processor is exiting a deep power down mode, it may be desirable to reduce exit latency related to restoring the processor state so that the processor can more quickly begin to process data again. Such reductions may also reduce may also reduce the power consumption required to enter and exit the deep power down mode.

This document describes embodiments that minimize deep power down mode entry and exit power usage and latencies by powering critical state registers of the processor with a secondary uninterrupted power supply in addition to the operating voltage, so that during deep power down mode, such as a zero voltage processor state (e.g., "deep sleep" or "off" state), the registers are able to locally maintain the critical state data. In such embodiments, the power usage, entry latency and exit latency can be reduced by providing a secondary uninterrupted voltage supply to an always on circuit with a keeper circuit that resides locally within each critical state register of the processor. When a register receives a control signal indicating that a processor power state of the processor is going to be reduced from an active processor power state to a zero processor power state, the critical state registers may locally store the critical state data by writing it from the critical state register latches to keeper circuits that are supplied with the uninterrupted power. Then, when a register receives a control signal indicating that a processor power state of the processor is going to be increased from the zero processor power state to an active processor power state, the critical state data stored in the keeper circuits may be written back to the critical state register latches. Thus, embodiments described herein provide more energy efficient and energy conserving processor deep power down mode by reducing deep power down mode entry latency, exit latency, and power consumption because the critical state data is stored locally (e.g., within each critical state register) in the keeper circuits and does not need to be transferred to and from a separate memory (e.g., SRAM).

FIG. 1 description of a processor that may be used to implement improved processor core deep power down exit latency by using secondary uninterrupted power supplied to state registers of the processor, according to some embodiments of the present invention. FIG. 1 shows processor 102 including processor die 104, execution unit 110, thermal sensor 120, power gates 130 and power control unit 140. Execution unit 110 includes non-critical state registers 112 and critical state registers 114.

Execution unit 110 is configured to process data for an operating system running on or using unit 110 for processing. Execution unit 110 is also configured to process data for one or more applications (e.g., software applications) running on the operating system. Unit 110 may include hardware, circuitry, components and/or logic necessary for such processing. In addition, such processing may include using hardware, circuitry, components and/or logic in addition to unit 110. Non-critical state registers 112 and critical state registers 114 will be explained further below.

Power gates 130 are shown coupled to execution unit 110 (e.g., including by lines 132 and 134). These gates may be described as embedded power gates in the core (e.g., on die 104 with and attached directly to unit 110). In some cases, gates 130 include circuitry and voltage (e.g., ground planes and power planes, such as including lines 132 and 134) attached, formed, or mounted onto surfaces (e.g., a inside surfaces) of unit 110. These planes may be attached to power leads or contacts of unit 110. According to some embodiments, gates 130 are switch capacitor circuits that are used for power plane isolation (power gating) of digital circuits. They operate in normal (voltage=Vcc) mode; or they operate in high resistance (voltage=Vcc/10) mode, thereby reducing the leakage power of the unit under control (e.g., unit 110). Some descriptions herein of unit 110 consider that gates 130 are included in or as a part of the circuitry of unit 110.

According to some embodiments, power control unit 140 is configured to control the operating voltage of the processor (e.g., by controlling gates 130 and registers 114). Unit 140 may include hardware logic and/or BIOS configured to perform such control. In some cases, unit 140 includes hardware, hardware logic, memory, integrated circuitry, programmable gate arrays, controllers, buffers, flip-flops, registers, state machines, FPGAs, PLDs, active devices (e.g., transistors, etc.), passive devices (e.g., inductors, capacitors, resistors, etc.), and/or other circuit elements to perform energy efficient thermal throttling of a processor using deep power down mode, according to embodiments of the present invention.

Power control unit 140 is coupled to power gates 130 by control signal line 144. Line 144 may be a voltage and frequency ("V/F") control signal line. Line 144 may represent one or more control signals (e.g., digital "C" processor state or mode command signals as noted below) sent to gates 130 using one or more signal lines. Processor 102 (e.g., Execution unit 110) may be put into or removed from any of the above C states as a result of unit 140 sending a control signal to unit 110 (e.g., via line 144 to gates 130). The C states generally have different entry/exit latencies and power savings.

In some cases, lines 144 may represent or be used by unit 140 to send a platform "Deeper Sleep" control signal such as a C6 state control signal, DPRSLPVR signal or other similar signal. In some cases, line 144 may represent or be used by unit 140 to send a platform "wake" signal such as a C0 signal or other similar signal.

Power control unit 140 is also coupled to unit 110 by logic control signal line 146. Line 146 may represent one or more logic control signals (e.g., digital "C" processor state or mode command signals as noted below) sent to unit 110 using one or more signal lines.

In some embodiments, "Sleep" logic may reside in unit 140, which sends a zero state and then ramp up voltage instructions to gates 130 (e.g., via line 144), and may also send a logical zero state and then logical ramp up voltage instructions to unit 110 (e.g., via line 146). For example, unit 140 may include zero voltage entry/exit logic and clock/power management logic of processor 102 (e.g., unit 110 and gates 130) that causes gates 130 to send a zero processor or an active processor power state to critical and non-critical state registers of unit 110.

In response to receiving a request to enter a zero voltage power management state (e.g., zero processor power state), zero voltage entry/exit logic of unit 140 may send an entry/exit control signal to unit 110 (e.g., via line 146) which causes unit 110 (e.g., upon receipt thereof) to Halt cleanly and stop processing, such as including finishing external tasks. This may be referred to as a "logical halt." Such an entry/exit logic signal may include a "Go_C6" signal (which is like a DPSLP signal, such as a signal that changes or sets a logical zero power state, or logical C6 state).

Then, also in response to receiving the request to enter a zero voltage power management state, clock/power management logic of unit 140 may reduce the reference operating voltage of the processor to zero voltage and frequency. Here, zero voltage clock/power management logic of unit 140 may send a clock/power management control signal to gates 130 (e.g., via line 144) which causes gates 130 (e.g., upon receipt thereof) to reduce to zero the operating voltage and clock frequency available to unit 110 (e.g., takes out the voltage from the "halted" processing unit). This may be referred to as a "power halt." Such a voltage clock/power management logic signal may include an "EPG_Enable" signal (e.g., a signal that changes or sets (e.g. "does") the Electrical-power gating to zero power state, or power C6 state).

Subsequently, in response to receiving a request to exit the zero voltage power management state (e.g., active processor power state), zero voltage power management logic of unit 140 may send a wake power management control signal to unit 110 (e.g., via line 146) which causes unit 110 (e.g., upon receipt thereof) to Enables power to the module (e.g., unit 110). This may be referred to as a "power wake." Such a voltage clock/power management logic signal may include an "EPG_Disable" signal (e.g., a signal that changes or sets the Electrical-power gating to active power state, or power C0 state).

Then, in response to receiving the request to exit the zero voltage power management state, zero voltage entry/exit logic of unit 140 may send an entry/exit control signal to unit 110 (e.g., via line 146) which causes unit 110 (e.g., upon receipt thereof) to WAKE and start processing, such as including external tasks. This may be referred to as a "logical wake." Such an entry/exit logic signal may include a "Go_C0" signal (e.g., which is like a WAKE signal, such as a signal that changes or sets a logical active power state, or logical C0-C5 state).

Although many of the embodiments described herein consider the C6 state to be a zero processor power state and the C0 state to be an active processor power state (e.g., a non-zero processor power state) other embodiments are considered. For example, in some embodiments, a zero voltage power management state, when implemented in conjunction with ACPI standards, may be referred to as the C6 state. In some embodiments it may be referred to as including the C5 and C6 states. This may include any power state where the voltage goes below retention (C5), all the way to 0 (C6). Thus, the concepts described herein with respect to a C6 state representing a zero voltage power management state or a zero processor power state, can also be applied with respect embodiments where a C5-C6 state represents a zero voltage power management state or a zero processor power state.

In some embodiments, an active or non-zero voltage power management state, when implemented in conjunction with ACPI standards, may be referred to as the C0 state. In some embodiments it may be referred to as including the C0-C4 or the C0-C5 states. In some cases, an active power state includes any power state other than where the voltage goes below retention (C5), all the way to 0 (C6). Thus, the concepts described herein with respect to a C0-C5 state representing an active (or non-zero) voltage power management state or an active or non-zero processor power state, can also be applied with respect to embodiments where a C0-C4 state represents an active voltage power management state or an active processor power state.

Power gates 130 are coupled to non-critical state registers 112 and critical state registers 114 by operating voltage line 132. Line 132 may represent or provide an operational voltage (e.g., voltage=Vcc) to circuitry of the processor, such as to processing circuitry, logic, memory, and state registers of execution unit 110. Line 132 may represent or provide an operational voltage and frequency to circuitry of the processor. In some embodiments, line 132 may represent or provide an operational voltage (e.g., zero or active processor power state voltage) to execution unit 110, non-critical state registers 112 and critical state registers 114 of execution unit 110.

Power gates 130 are also coupled to and critical state registers 114 by uninterrupted voltage line 134. Line 134 may represent or provide a secondary (e.g., to line 132) "uninterrupted" operational voltage to circuitry of the processor, such as to critical state registers 114 of execution unit 110. In some embodiments, line 134 may represent or provide a secondary uninterrupted voltage (e.g., active processor power state voltage) to critical state registers 114, but not to execution unit 110, or non-critical state registers 112 of execution unit 110. Line 134 may represent or be a voltage plane to registers 114 of the processor (or of multiple cores of a processor) that always remains powered to preserve the critical state of the processor during the zero voltage power management state. The voltage plane may be considered part of gates 130 and part of registers 114 (e.g., see line 134 in FIGS. 3-4).

Lines 132 and 134 may be a voltage and frequency ("V/F") signal lines. Lines 132 and 134 may represent one or more voltage or power signals sufficient to power the circuitry of the state registers 112 and 114 as described herein (e.g., including but not limited to the circuitry described herein). Use of lines 132 and 134 will be described in more detail below.

Power control unit 140 is also coupled to execution unit 110 by initiate/exit zero power control signal line 142. In some cases, line 142 may represent or be used by unit 140 to send a platform "Deeper Sleep" signal such as a C6 state control signal, DPRSLPVR signal, a HALT signal, an MWAIT signal, a logic control signal of line 146, a subset of such any of those signals, or another similar signal. In some cases, line 142 may represent or be used by unit 140 to send a platform "wake" signal such as a C0 signal, a logic control signal of line 146, a subset of such any of those signals, or other similar signal. Use of line 142 will be described in more detail below.

Execution unit 110, power gates 130, power control unit 140, and lines 132, 134, 142, 144 and 146 may be formed on or in processor die 104 as known in the art. In some cases, power gates 130 may be described as coupled between execution unit 110 and power control unit 140. In some cases, processor die 104 is a single die or "chip". In other cases, processor die 104 represents two or more die or "chips". It is considered that gates 130, registers 112 and 114, and lines 132 and 134 may be considered part of (e.g., be or form power planes common with) unit 110. In some cases, line 142 may also be considered part of (e.g., be or form power planes common with) unit 110.

Figure 2:
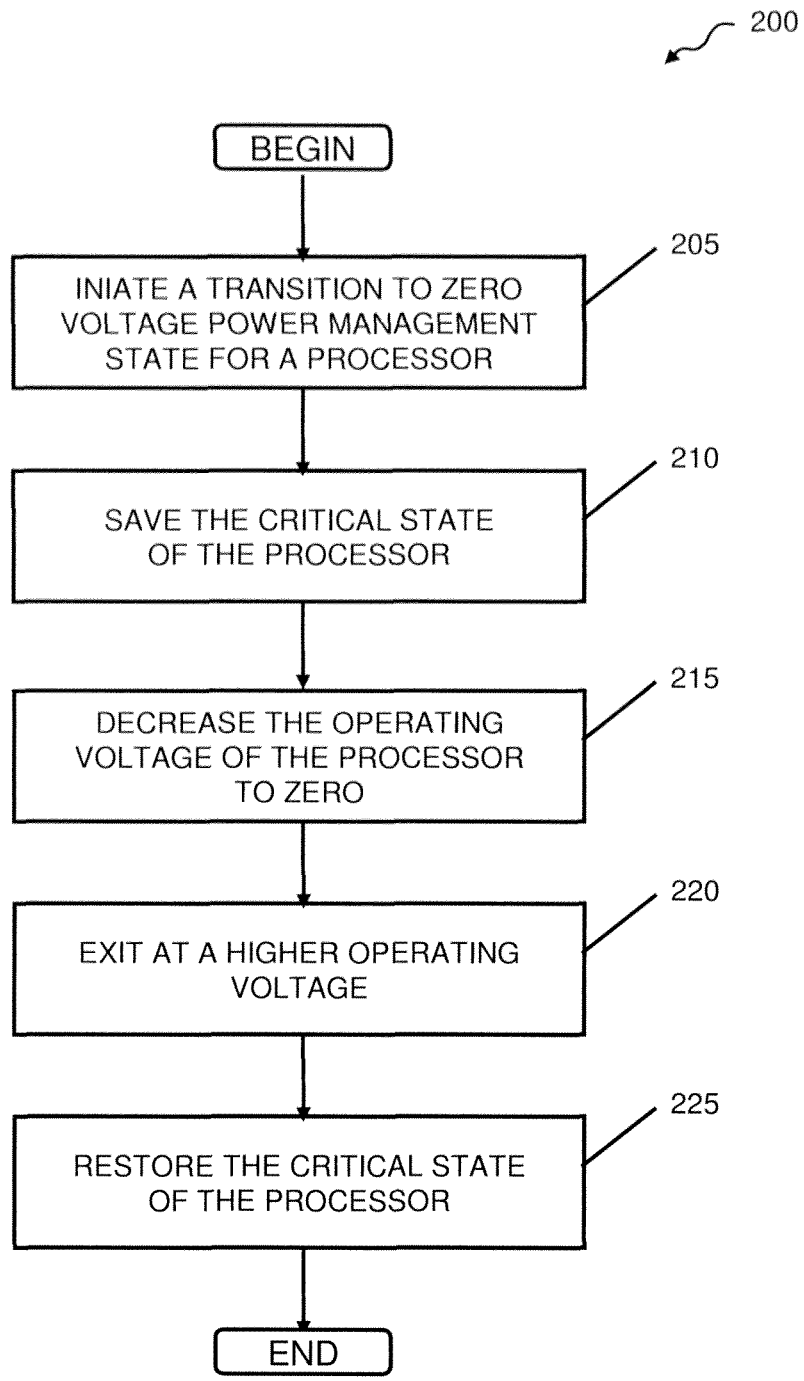
FIG. 2 is a flow diagram illustrating a process to transition into and transition out of a deep down power management state for a processor, according to some embodiments of the present invention.

FIG. 2 is a flow diagram illustrating process 200 to transition into (e.g., enter) and transition out of (e.g., exit) a deep down power management state for a processor, according to some embodiments of the present invention. With reference to FIG. 2, in one embodiment, an integrated circuit device such as a processor, for example, initiates a transition to a zero voltage power management state at block 205. The zero voltage power management state may be, for example, a Deeper Sleep state in accordance with the ACPI Specification.

During this transition, the critical state of the processor is saved (block 210). The critical state of the processor may be represented by or includes "critical" state variables or critical state data which is identified during design (e.g., design and testing) of the processor to include all of the required state data needed to put or "program" the state of the processor for execution or processing of software (e.g., an operating system and software applications). According to some embodiments, such design may take into consideration a type of device (e.g. certain manufacturer and model of mobile phone, desktop computer, laptop computer) into which the processor and execution unit is to be installed. In some embodiments, the critical state data includes state variables or data associated with the architectural, micro-architectural, debug state, and/or similar state variables associated with that processor.

This critical state data may be stored in certain registers of the processor described as "critical" state registers. In some cases, the "critical" state registers only store the critical state data. In other cases, each "critical" state registers stores at least one bit of critical state data, but may store other state data as well. The "critical" state registers may be a predetermined critical state register subset, identified during processor design (e.g., design and testing). The "critical" state registers may be a predetermined critical state register subset, of a total number of possible state registers of the processor. In some cases, the "critical" state registers are between 3 and 15 percent of the total number of state registers of the processor. In some cases, the "critical" state registers are model-specific registers (MSRs) and control registers (CRs) of the critical portions of processor. They may also include registers for the processor core IDs, shared states, and dedicated states. According to embodiments, lines 132, 134 and 142 are provided to each critical state register identified for the processor (e.g., that type of processor based on its design). On the other hand, of those lines, only line 132 may be provided to each non-critical state register identified for the processor (e.g., that type of processor based on its design).

The operating voltage of the processor is subsequently reduced to approximately zero such that the processor is in a very deep sleep state (e.g., C6 state) that has very low power consumption characteristics (e.g., deep power down) (block 215). Hereinafter reference to the state or critical state of the processor or CPU will be meant to include state variables associated with the processor or CPU.

Subsequently, in response to receiving a request to exit the zero voltage power management state, the processor exits the zero voltage power management at a higher reference operating voltage at block 220. The critical state variables associated with the processor are also restored (block 225). It should be noted that for some embodiments, the reference operating voltage may be a minimum active state operating voltage, for example.

"Active" and "Zero" Power States

In some embodiments, processor 102 (e.g., Execution unit 110) may be put in the C6 state (e.g., see block 215) as a result of unit 140 sending a C6 control signal to unit 110 (e.g., via line 144 to gates 130) to change the current C state to the C0 state. This may occur in accordance with the ACPI Specification, to cool the processor, for energy efficiency and ion associated with integrated circuits (e.g., the processor) and/or due to environmental concerns. In some cases, changing, altering, transitioning or moving a processor power state to an "active processor power state" may be described by putting processor 102 (e.g., Execution unit 110) into a C state in which the processor is processing or executing data for an operating system, and optionally also for one or more applications running on that operating system (e.g., such as from a "zero processor power state"). For instance, an active processor power state describes that execution unit 110 is operational (e.g., C0 state) and performs processing of data for an operating system and for an application running on that operating system. In some embodiments, an active processor power state describes that execution unit 110 is in a non-C6 state (e.g., C0-C5 state) and not processing data. In some cases, changing, altering, transitioning or moving a processor power state to a "zero processor power state" may be described by putting processor 102 (e.g., Execution unit 110) into the C6 state (e.g., such as from an "active processor power state" as noted herein).

In some embodiments, processor 102 (e.g., Execution unit 110) may be removed (e.g., waken) from the C6 state (e.g., see block 220) as a result of unit 140 sending a different C control signal (e.g., via line 144 to gates 130) to unit 110 to change the C6 state to a different C state (such as an "active processor power state"). In some embodiments the C6 state described in the paragraphs above may include the C5 and C6 states, such as where a zero processor power state includes the C5 and C6 states.

Upon entering or initiating a deep down power mode, line 142 may provide a first control signal that causes register 114 to write critical state data from state register latches to keeper circuits that are supplied with the uninterrupted power 134. In some cases, the first control signal may be any of a platform "Deeper Sleep" signal such as a C6 state control signal, DPRSLPVR signal, a HALT signal, an MWAIT signal, a logic control signal of line 146, a subset of such any of those signals, or another similar signal that is asserted by unit 140. Upon exiting the deep down power mode, line 142 may also provide a second control signal (or voltage 132 and clock 328) that causes register 114 to write the critical state data stored in the keeper circuits back to the state register latches. In some embodiments, the second control signal may be any of a platform "wake" signal such as a C0 signal, a logic control signal of line 146, a subset of such any of those signals, or other signal is asserted by unit 140. In some cases, the first control signal may be a maintained high or low signal, and the second control signal may be the opposite signal (e.g., low or high, respectively). In some cases, upon ng the deep down power mode, line 142 may also provide a second control signal (or voltage 132 and clock 328) allows the data stored in the keeper circuit to be available to the processor, so that data can be read from register 114 by the processor and subsequently written back to the state register latches of register 114.

Figure 3:
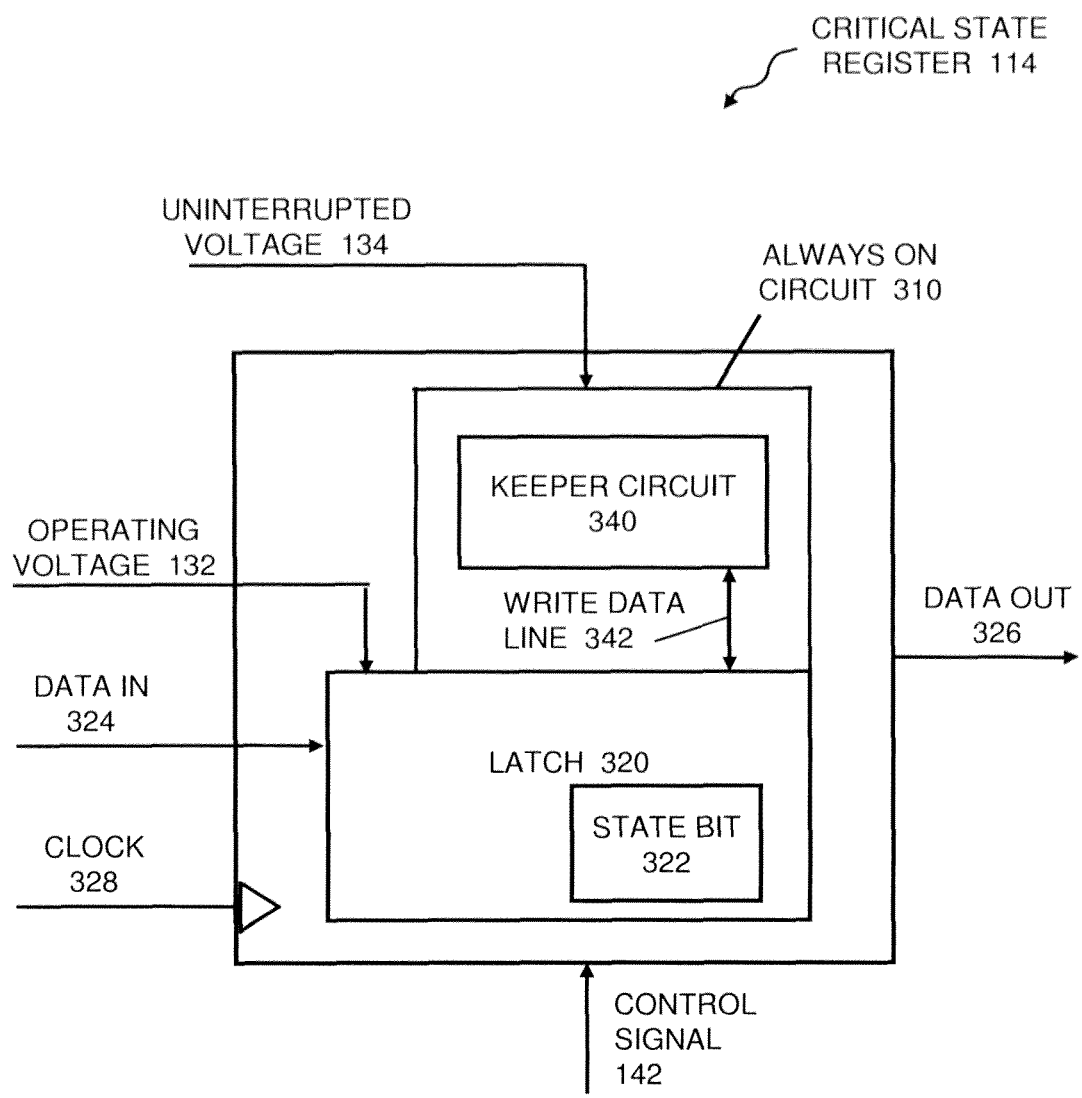
FIG. 3 is a critical state register that may be used to implement improved processor core deep power down exit latency by using secondary uninterrupted power supplied to state registers of the processor, according to some embodiments of the present invention.

In some embodiments the C6 state described above in this paragraph may include the C5 and C6 states, such as where a zero processor power state includes the C5 and C6 states. FIG. 3 is a critical state register that may be used to implement improved processor core deep power down exit latency by using secondary uninterrupted power supplied to state registers of the processor, according to some embodiments of the present invention.

FIG. 3 shows critical state registers 114 including latch 320 (e.g., a critical state data latch) and always on circuit 310 having keeper circuit 340. Register 114 is shown connected to operating voltage 132, uninterrupted voltage 134, data in line 324, data out line 326, clock 328, and control signal line 142. Other connections, components, and signals may exist for register 114, such as know for processor state registers.

Latch 320 includes state bit 322, such as for storing critical state data of the processor. Latch 320 is connected to data in line 324, data out line 326, and operating voltage 132. Data in line 324 and data out line 326 may be used by register 114 to write data to, and read data from bit 322. Operating voltage 132 may be used to power latch 320, such as to be used to store critical state data in bit 322. Clock 328 may be applied to latch 320, such as to be used to read, write and store critical state data in bit 322.

Latch 320 (e.g., bit 322) is connected to always on circuit 310 by write data line 342. Write data line 342 may be used by register 114 to write data from bit 322 to, and read data from circuit 340 (e.g., into bit 322). Control signal 142 (e.g., a high signal, which may be maintained during zero power mode) may be applied to latch 320, such as to cause latch 320 to write critical state data stored in bit 322 to circuit 340.

Always on circuit 310 includes keeper circuit 340, such as for storing critical state data of the processor (e.g., when the processor is in powered down state). Always on circuit 310 is connected to uninterrupted voltage 134. Uninterrupted voltage 134 may be used to power always on circuit 310, such as to be used to store critical state data in circuit 340. Thus, keeper circuit 340 is always on during the powered down state and maintains critical state data written to circuit 340 from bit 322. Clock 328 (or a B-clock derived from clock 328) may be applied to circuit 340, such as to be used to read, write and store critical state data in circuit 340.

Write data line 342 may be used by register 114 to write data from circuit 340 to, and read data from bit 322 (e.g., into circuit 340). Control signal 142 (e.g., a low signal, which may be maintained during active power mode) may be applied to latch 320, such as to cause circuit 340 to write, or provide for reading, critical state data stored in circuit 340 to the processor (e.g., unit 110) and/or back to bit 322. In some cases, when the control signal 142 goes down (e.g., even before clock is valid), the state data stored in circuit 340 is available to the DataOut 326 (e.g., at a data out pin) through the keeper logic 340.

In some cases, each register 114 may be described as having state bit 322 and a corresponding keeper circuit 340 to store a bit of state data from the state bit. Each register 114 may be configured to, based on a first control signal (e.g., deep sleep state control signal), write the state data (e.g., a bit; a "1" or "0"; or a "bit of state data") stored in the state bit 322 to the corresponding keeper circuit 340.

Each register 114 may also be configured to, based on a second control signal (e.g., active state control signal), provide the state data (e.g., a bit; a "1" or "0"; or a "bit of state data") stored in the keeper circuit 340 to or at the data out line 326. The state data may be subsequently read by the processor and written back to bit 322 of the same register 114. This may be described as register 114 being configured to, based on a second control signal (e.g., active state control signal), write the state data (e.g., a bit; a "1" or "0"; or a "bit of state data") stored in the keeper circuit 340 to the corresponding state bit 322.

In some cases, each register 114 may be described as having more than one state bit and a corresponding number of bits in the always on circuit to store more than one bit of state data from the state bits. In this case there may be a number of bits for storage in the corresponding always on circuit 310 that is equal to the number of state bits 322 in the register. According to some embodiments, the number of bits may be 16, 24, 32, or 64 bits. In some cases there may be 32 bits in the register. For example, register 114 may have 32 critical state bits (e.g., represented by bits 322 of FIG. 3) and be able to store those 32 bits in 32 storage bits of a keeper circuit (e.g., represented by always on circuit 310 of FIG. 3). In some embodiments, there is one bit per flop (e.g., pass gate 452 or dual latches 462 of FIG. 4) and register 114 has 32 flops in it. Each register 114 may be configured to, based on a first control signal (e.g., deep sleep state control signal), write the multiple bits of state data (e.g., 32 bits; each a "1" or "0"; or a "bit of state data") stored in the state bits to the corresponding keeper circuit bits. This may include multiple flops (e.g., each a pass gate 452 or a dual latches 462 of FIG. 4) writing to the corresponding keeper circuit 340 (e.g., of always on circuit 410 and 412 of FIG. 4), respectively.

Theme concepts also apply to writing more than one bit stored in the always on circuits, back to the state registers. In some cases, each register 114 may be described as having more than one bit of data (e.g., multiple bits such as 32 bits) in the always on circuit to be made available to the processor, or to be written back to a corresponding number of bits of the state registers. These more than one bit per register concepts (e.g., multiple bits such as 32 bits) may also be applicable to the other single bit descriptions herein.

Figure 4A:
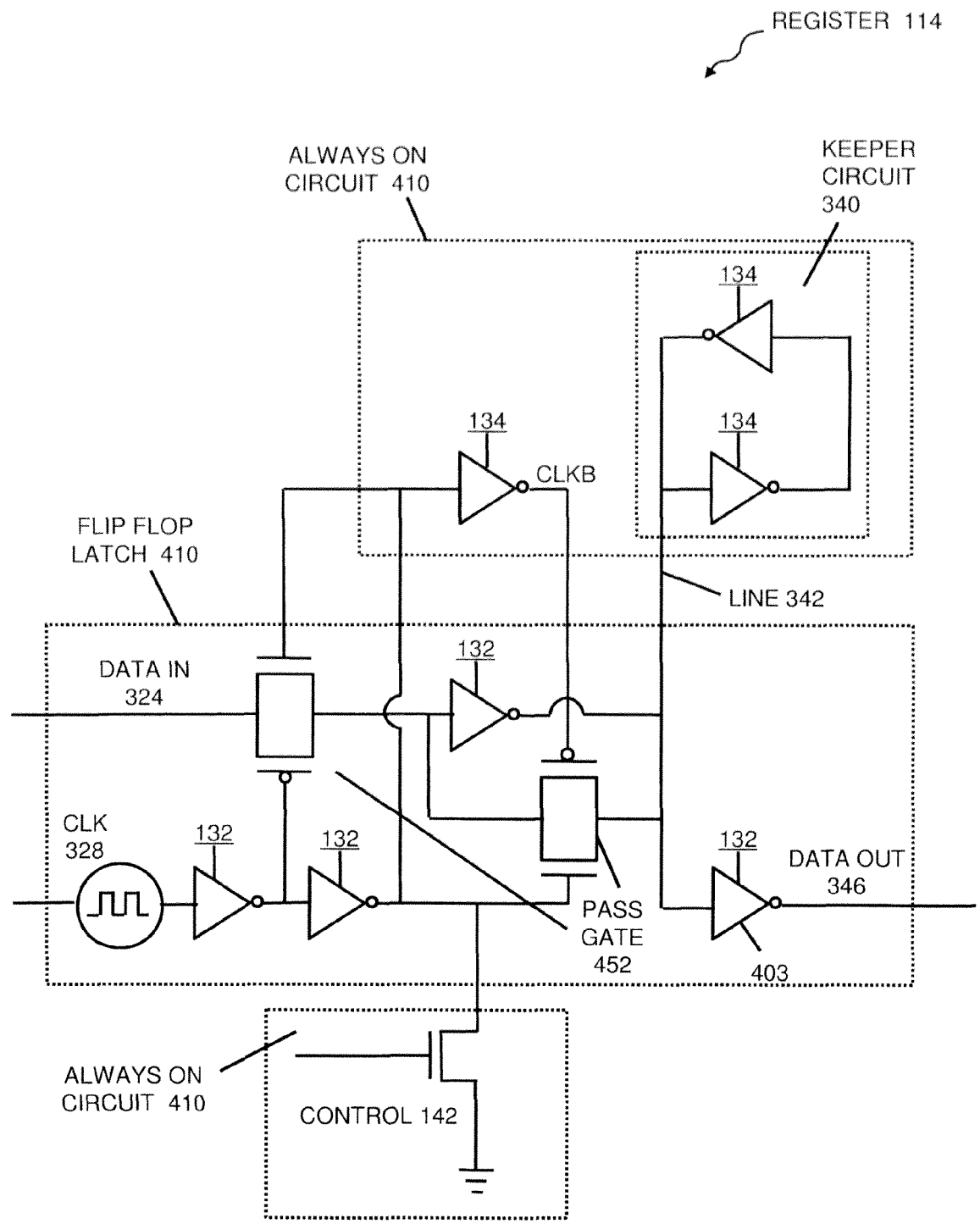
FIG. 4A is critical state flip flop latch register that may be used to implement improved processor core deep power down exit latency by using secondary uninterrupted power supplied to state registers of the processor, according to some embodiments of the present invention.

FIG. 4A is critical state flip flop latch register that may be used to implement improved processor core deep power down exit latency by using secondary uninterrupted power supplied to state registers of the processor, according to some embodiments of the present invention. FIG. 4A shows an embodiment of critical state registers 114 including flip flop latch 400 (e.g., a critical state data latch) and always on circuit 410 having keeper circuit 340. Latch 400 is shown connected to operating voltage 132, data in line 324, data out line 326, clock 328, and control signal line 142. Register 114 is shown including a number of inverters (e.g., see inverter 403 for example) and other circuitry components know in the art. Latch 400 includes Pass Gate 452. Latch 400 or gate 452 (or both) may represent bit 322 of FIG. 3, such as for storing critical state data. Write data line 342 may be used by latch 400 to write data from gate 452 to, and read data from circuit 340 (e.g., into gate 452).

In some cases, latch 400 may be described as a powered down part of the register, and contains clock and DataIn pins to Pass gate 452 and final output DataOut 326 through inverter 403. Control signal 142 pulls the pass gate down to generate a '0 at the input to the final inverter 403. Always powered on circuitry 410 has voltage 134 (e.g., "sustained-Vcc") and using a keeper circuitry 340, retains the original value of the latch through a power down. When the control signal 142 goes down (e.g., even before clock is valid), the correct value is available to the DataOut 326 (e.g., at a data out pin) through the keeper logic 340.

In some cases, upon receiving a signal at control 142 (e.g., a high signal, that may be a single control signal or may be maintained during zero power mode), latch 400 causes critical state data stored in gate 452 to be written to circuit 340 using line 342. However data stored in gate 452 will be deleted or erased upon loss of voltage 132 or clock 328 (or both).

Always on circuit 410 is shown connected to uninterrupted voltage 134; and connected to latch 400 by clock 328 (e.g., to provide pass gate 452 with Clock B—an inverted version of clock 328), and write data line 342. Circuit 410 may represent circuit 310 of FIG. 3.

During deep down power mode (e.g., zero processor power state, such as C6 state or C5-C6 state) uninterrupted voltage 134 continues to be supplied to circuit 340 and data stored in the inverters of circuit 340 continues to be stored there by being repeatedly written from one inverter to the other. Thus, keeper circuit 340 is always on during this state and maintains critical state data written to circuit 340 from gate 452.

Write data line 342 may be used by circuit 340 to write data from circuit 340 to gate 452 using line 342. For example, the data may be written to or read from data out 326 by unit 110 so that the data is subsequently written by the processor to gate 452.

In some embodiments, upon receiving a signal at control 142 (e.g., a low signal, that may be a single control signal or may be maintained during zero power mode), latch 400 causes critical state data stored in circuit 340 to be available for reading by unit 110 at data out 326 using line 342. In some cases, it is not necessary to increase of voltage 132 or clock 328 (or both) for data stored in circuit 340 to be available at data out 326 using line 342.

Although writing to and reading from circuit 340 is described using a high then low signal at line 142, it can be appreciated that other (e.g., reversed) signals can be used. Also, other connections, components, and signals may exist for register 114, such as know for processor state registers (e.g., ground plane, etc.).

Figure 4B:
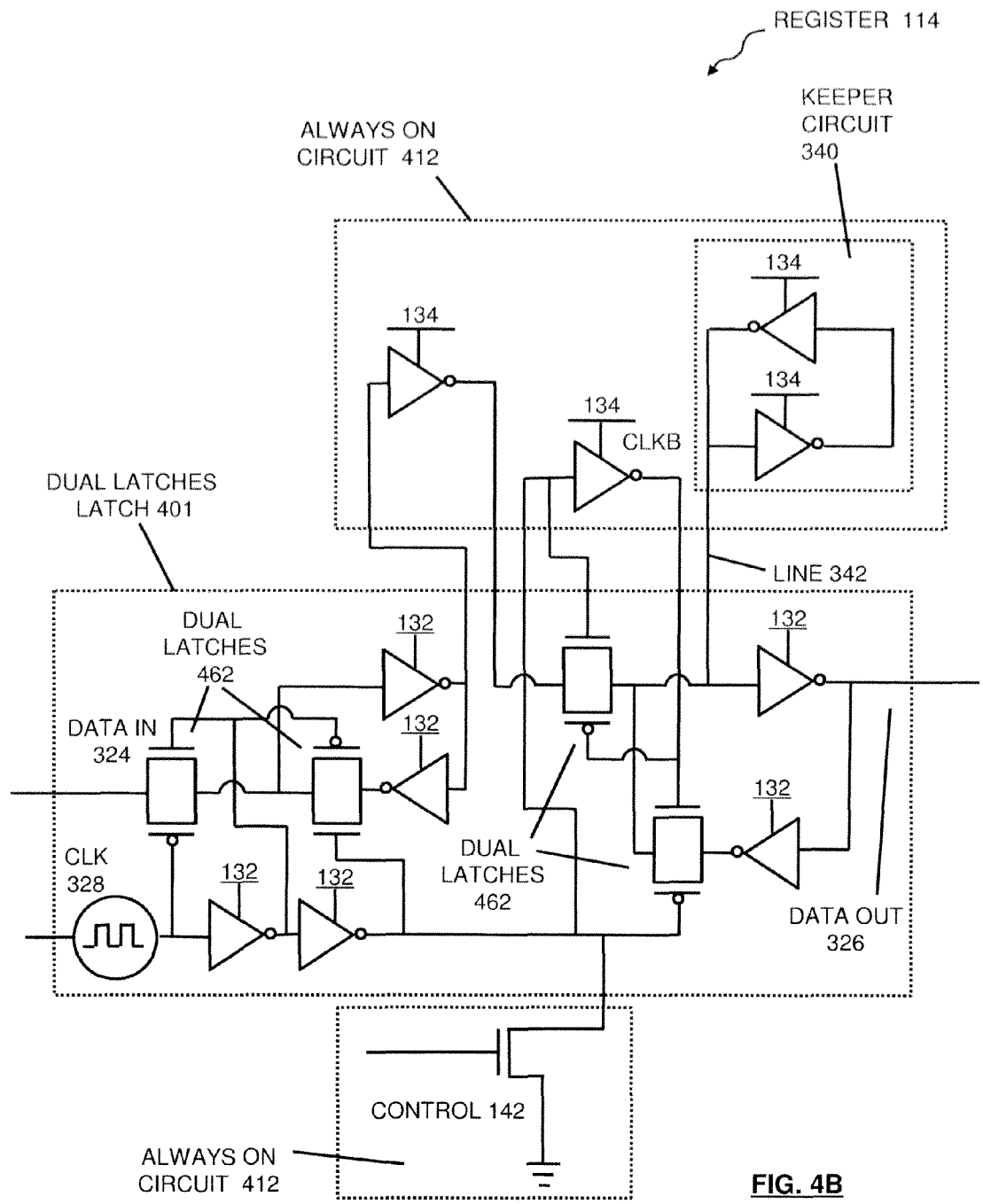
FIG. 4B is critical state dual latches latch register that may be used to implement improved processor core deep power down exit latency by using secondary uninterrupted power supplied to state registers of the processor, according to some embodiments of the present invention.

FIG. 4B is critical state dual latches latch register that may be used to implement improved processor core deep power down exit latency by using secondary uninterrupted power supplied to state registers of the processor, according to some embodiments of the present invention. FIG. 4B shows an embodiment of critical state registers 114 including dual latches latch 401 (e.g., a critical state data latch) and always on circuit 412 having keeper circuit 340. Latch 401 is shown connected to operating voltage 132, data in line 324, data out line 326, clock 328, and control signal line 142. Register 114 is shown including a number of inverters (e.g., see inverter 403 for example) and other circuitry components know in the art. Latch 401 includes Dual Latches 462. Latch 401 or Dual Latches 462 (or both) may represent bit 322 of FIG. 3, such as for storing critical state data. Write data lines 342 may be used by latch 401 to write data from Dual Latches 462 to, and read data from circuit 340 (e.g., into Dual Latches 462).

Upon receiving a signal (e.g., high) at control 142, latch 401 causes critical state data stored in Dual Latches 462 to be written to circuit 340 using lines 342. However data stored in Dual Latches 462 will be deleted or erased upon loss of voltage 132 or clock 328 (or both). Always on circuit 412 is shown connected to uninterrupted voltage 134; and connected to latch 401 write data lines 342. Circuit 412 may represent circuit 310 of FIG. 3.

During deep down power mode (e.g., zero processor power state, such as C6 state or C5-C6 state) uninterrupted voltage 134 continues to be supplied to circuit 340 and data stored in the inverters of circuit 340 continues to be stored there by being repeatedly written from one to the other. Thus, keeper circuit 340 is always on during this state and maintains critical state data written to circuit 340 from Dual Latches 462.

Write data lines 342 may be used by circuit 340 to write data from circuit 340 to Dual Latches 462 using lines 342. For example, the data may be written to data out 326 so that the data is subsequently written by the processor to Dual Latches 462.

In some embodiments, upon receiving a signal at control 142 (e.g., a low signal, that may be a single control signal or may be maintained during zero power mode), latch 401 causes critical state data stored in circuit 340 to be available for reading by unit 110 at data out 326 using lines 342. In some cases, it is not necessary to increase of voltage 132 or clock 328 (or both) for data stored in circuit 340 to be available at data out 326 using lines 342.

In FIGS. 3, 4A and 4B, although writing to and reading from circuit 340 is described using a high then low signal at line 142, it can be appreciated that other (e.g., reversed) signals can be used. Also, in FIGS. 3, 4A and 4B, other connections, components, and signals may exist for register 114, such as know for processor state registers (e.g., ground plane, etc.). Moreover, it can be appreciated that other designs for register 114 can be used to accomplish the process and functions described herein (e.g., for FIGS. 3, 4A and 4B).

Figure 5:
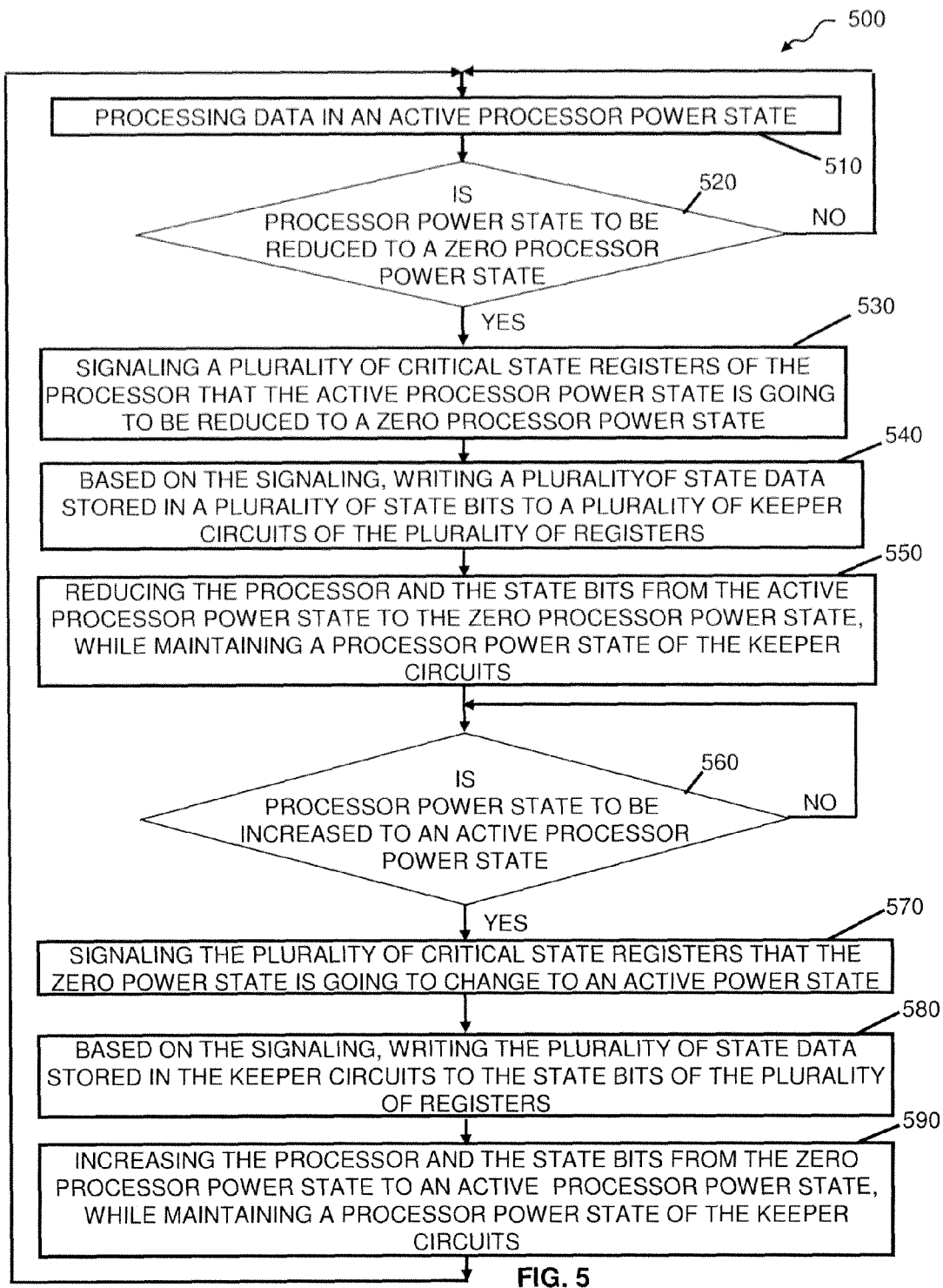
FIG. 5 is a flow diagram of a process that may be used to implement improved processor core deep power down exit latency by using secondary uninterrupted power supplied to state registers of the processor, according to some embodiments of the present invention.

FIG. 5 is a flow diagram of a process 500 that may be used to implement improved processor core deep power down exit latency by using secondary uninterrupted power supplied to state registers of the processor, according to some embodiments of the present invention. Process 500 may be performed by hardware circuitry of processor 102 and may be controlled by circuitry of control unit 140.

At block 510 a processor (e.g., processor 102 or execution unit 110) is performing processing of data in an active processor power state. Block 510 may describe a processor executing data for an operating system, and optionally also for one or more applications (e.g., software applications) running on that operating system. The active processor power state may be a non-zero power state, or a processor power state equal to or above a thermal design point of the processor.

At decision block 520 it is determined whether a processor power state is to be reduced to a zero processor power state. If the processor power state is not to be reduced to a zero processor power state, processing returns to block 510. While the processor power state is not to be reduced to a zero processor power state, the current processor C state may be maintained or otherwise controlled by unit 140, or otherwise (e.g., by operating system and other hardware) (thus returning the process to block 510).

If the processor power state is to be reduced to a zero processor power state, processing continues to block 530. At block 530 the critical state registers of the processor are signaled that the active processor power state is going to be reduced to a zero processor power state. Block 530 may include power control unit 140 sending a first control signal (e.g., send and maintain a high signal) to all of the critical state registers of processor 102 that a processor power state of the processor (e.g., that operating voltage 132 supplied to execution unit 110, non critical state registers 112, and critical state register 114; but not continuous second supply voltage 134) is going to be changed (reduced or set to zero) from an active processor power state to a zero processor power state. Block 530 may include unit 140 sending or providing on line 142, a platform "Deeper Sleep" signal such as a C6 state control signal, DPRSLPVR signal, a HALT signal, an MWAIT signal, a logic control signal of line 146, a subset of such any of those signals, or another similar signal. Processing then continues to block 540.

At block 540 based on the signaling (due to or as a result of receiving a first control signal or zero power state control signal), a plurality of state data stored in a plurality of state bits of the registers is written to a plurality of keeper circuits of the plurality of registers. The state bits may be predetermined (e.g., during processor design) to include state bits required to define a state of the processor necessary for the processor to process data for an operating system and for an application running on that operating system. Block 540 may include each critical state register writing a state bit to a corresponding keeper circuit to store that bit of state data, as a result of receiving a deep sleep state control signal. In some cases, block 540 includes each register 114, based on a first control signal (e.g., deep sleep state control signal), writing the state data stored in the state bit 322, latch 400, latch 401, gate 452 and/or latches 462 to the corresponding keeper circuit 340. The writing may include writing the state data stored in the state bits to the keeper circuits of the plurality of registers, without writing the state data to a volatile memory.

At block 550 the processor and the state bits are changed from the active processor power state to the zero processor power state, while maintaining a processor power state of the keeper circuits. Block 550 may include reducing the processor and the state bits power states from the active processor power state to the zero processor power state to reduce power consumption. While maintaining a processor power state (e.g., an active power state) of the keeper circuits to maintain the plurality of state data stored in the plurality of keeper circuits. Maintaining a processor power state of the keeper circuits may include maintaining or using a dedicated, uninterrupted, continuous secondary power supply. Such a supply may provide a secondary uninterrupted voltage (e.g., in addition to the normal operating voltage) if not otherwise controlled, such as to shut down or turn the device completely off.

Block 550 may describe power control unit 140 configured to signal (e.g., using a zero power control on line 144) a first power supply of the processor (e.g., of gates 130, but not shown) to change a processor power state (e.g., operating voltage line 132) of unit 110, registers 112 and registers 114 from the active processor power state to the zero processor power state. This may include maintaining a secondary uninterrupted processor power state (e.g., uninterrupted voltage line 134) of registers 114. This may include turning off the first power supply. For example, block 550 may represent changing a processor power state of the state bits to a zero power state, which includes or causes (e.g., the latches) erasing of the plurality of state data stored in the plurality of state bits. As noted herein, the state bits may be state registers of flip flop state registers and latch state registers. In some cases, this may include changing a power state of state bit 322, latch 400, latch 401, gate 452 and/or latches 462 to the zero power state while maintaining a secondary uninterrupted power state (e.g., an active power state, or normal operating voltage) of the corresponding keeper circuit 340. This may include line 132 being decreased or set to a zero processor power state (e.g., zero operating voltage). This may describe an operating voltage of the processor (e.g., of execution unit 110, non critical state registers 112, and critical state register 114) being changed from an active processor power state to a zero processor power state (e.g., zero operating voltage), where that change occurs between 1 and 100 microseconds after signaling of block 530. It may also describe a similar concept for the clock frequency of the processor (e.g., controlled on line 132 or otherwise).

In some embodiments, block 550 describes that upon or based on receiving the first control signal on line 144 from power control unit 140, gates 130 reduces to zero or turns off voltage on line 132 to change a processor power state of execution unit 110, registers 114 and bit 322 from the active processor power state to a zero processor power state. In some embodiments, block 550 may include turning the processor (e.g., processor 102 or execution unit 110) off or discontinuing any processing performed by the processor, other than storage of the critical state variables. Block 550 may describe a processor not executing data for an operating system, and not executing data for one or more applications e.g., software applications) running on that operating system.

Block 550 may describe the operating voltage of the processor changing from the active processor power state to a zero processor power state. The change may be performed in order to reduce the temperature of processor, performance, wasted energy, damage the environment, and battery use. The change may also be in order to accomplish or may result in increased energy efficiency and conservation associated with integrated circuits (e.g., the processor). The change may be based on a protocol or process to provide increased energy efficiency and conservation associated with integrated circuits.

At decision block 560 it is determined whether a processor power state is to be increased to an active processor power state. If the processor power state is not to be increased to an active processor power state, processing returns to block 560. While the processor power state is not to be increased to an active processor power state, the current processor zero power, deep power down, or C6 state may be maintained or otherwise controlled by unit 140, or otherwise controlled (e.g., by operating system and other hardware) (thus returning the process to block 560).

If the processor power state is to be increased to an active processor power state, processing continues to block 570. At block 570 the critical state registers of the processor are signaled that the zero processor power state is going to be increased to an active processor power state. Block 570 may include power control unit 140 sending a second control signal (e.g., send and maintain a low signal) to all of the critical state registers of processor 102 that a processor power state of the processor (e.g., that operating voltage 132 supplied to execution unit 110, non critical state registers 112, and critical state register 114; but not continuous second supply voltage 134) is going to be changed (reduced or set to an active voltage) from a zero processor power state to an active processor power state. Block 570 may include unit 140 sending or providing on line 142, a platform "wake" signal such as a C0 signal, a logic control signal of line 146, a subset of such any of those signals, or other similar signal. Processing then continues to block 580.

At block 580 based on the signaling (due to or as a result of receiving a second control signal or active power state control signal), a plurality of state data stored in a plurality of keeper circuits of the registers is written to a plurality of state bits of the plurality of registers. Block 580 may include each critical state register writing a keeper circuit to a corresponding state bit to store that bit of state data, as a result of receiving an active state control signal. The writing may include writing the state data stored in the keeper circuits to the state bits of the plurality of registers, without reading the state data from a volatile memory. In some case, this "writing" may include (e.g., the keeper circuits) outputting state data stored in the keeper circuits to an execution unit of the processor, or the processor reading the data from the keeper circuits. In some cases, block 540 includes each register 114, based on a second control signal (e.g., an active state control signal), writing the state data stored in the keeper circuit 340 to the corresponding state bit 322, latch 400, latch 401, gate 452 and/or latches 462. This may include each register 114, providing the state data stored in the keeper circuit to or at the data out line 326. The state data may be subsequently read by the processor and written back to the state bit of the same register 114.

At block 590 the processor and the state bits are changed from the zero processor power state to an active processor power state, while maintaining a processor power state of the keeper circuits. Block 590 may include increasing the processor and the state bits power states from the zero processor power state to an active processor power state (e.g., C0) to process data, while maintaining a processor power state (e.g., an active power state) of the keeper circuits. This may include having latches or keeper circuits 340 (e.g., line 134) follow core VCC (e.g., line 132) to guarantee full performance and simple modeling. This may also include having latches or keeper circuit 340 (e.g., line 134) always on and never lower than gated voltage (e.g., line 132). Block 590 may describe power control unit 140 configured to signal (e.g., using an active power control on line 144) a second power supply of the processor (e.g., of gates 130, but not shown) to change a processor power state (e.g., operating voltage line 132) of unit 110, registers 112 and registers 114 from the zero processor power state to an active processor power state. This may include maintaining power of the second power supply. In some cases, this may include maintaining a secondary uninterrupted processor power state (e.g., uninterrupted voltage line 134) of registers 114. In some cases, this may include changing a power state of state bit 322, latch 400, latch 401, gate 452 and/or latches 462 to an active power state while maintaining a secondary uninterrupted power state (e.g., an active power state) of the corresponding keeper circuit 340. This may include line 132 being increased or set from a zero processor power state to an active processor power state (e.g., normal operating voltage or voltages). This may describe an operating voltage of the processor (e.g., of execution unit 110, non critical state registers 112, and critical state register 114) being changed from a zero processor power state to an active processor power state (e.g., normal operating voltage or voltages), where that change occurs between 1 and 100 microseconds after signaling of block 560. It may also describe a similar concept for the clock frequency of the processor (e.g., controlled on line 132 or otherwise).

In some embodiments, block 590 describes that upon or based on receiving the second control signal on line 144 from power control unit 140, gates 130 increase to active or turns on voltage on line 132 to change a processor power state of execution unit 110, registers 114 and bit 322 from the zero processor power state to an active processor power state. In some embodiments, block 590 may include turning the processor (e.g., processor 102 or execution unit 110) on or initiating processing performed by the processor. The change may be performed in order to allow the processor to return to processing data (as controlled by battery, power or processing requirements or priorities of the computing device or of the processor.

After block 590 processing returns to block 510, such as to process or execute data for an operating system, and possible execute data for one or more applications (e.g., software applications) running on that operating system.

According to embodiments, a version of process 500 may exclude block 510. Also, according to some embodiments, blocks 510 and 560-590 may be optional.

As previously noted, obtaining low power sleep states is important to achieving better battery life in mobile devices. The mobile device market is a fiercely competitive product space and one of the key areas for advancement in this space is low-power solutions to preserve battery life. It is also beneficial to the environment and increases energy efficiency and conservation associated for integrated circuits (e.g., the processor).

The embodiments described above may perform with more energy efficiency and energy conservation than prior systems and processes. For example, they perform with reduced latency and possibly reduced power consumption as compared to other systems where, for example, state variables associated with the processor (e.g., the processor's current or most recent processing state) are saved in a dedicated cache memory (e.g., synchronous random access memory—SRAM). This is because SRAM save/restore functions for the processor during the entrance and exit of the zero voltage processor sleep state are not required. Moreover, neither a separate SRAM, the time to save/restore, nor microcode sections to enable this functionality are required in the processor for the embodiments described above.

In some cases, the embodiments herein provide writing the critical state data to the keeper circuits, storing it there, and restoring it to the critical state register latches more quickly and with less power consumption than writing, storing and restoring it from separate logic block (e.g., SRAM) with an independent power supply to the module. Instead, in some embodiments herein, the device logic blocks themselves (e.g., critical state registers) are designed as "dual power plane" logic blocks and so don't need this external module to save/restore the processor state or context data.

For instance, the embodiments herein do not include the performance, power and latency impact of moving state or context data from the local flop/latch to an external storage element (e.g., SRAM), which may require actual data transfer during the sleep mode (e.g., zero power mode). Such moving results in the I/O voltage typically being much higher than the logic voltage (1V vs. 0.6V). Thus, by using the embodiments herein, the state data can be retained the cells (e.g., critical state registers) at a much lower voltage (since the critical state registers do not need enough voltage to be operational (e.g., 1 volt)—just enough to retain the values (e.g., 0.6 volts). Consequently, the embodiments herein reduce the amount of power, performance and latency aspects required to write, store, and restore the critical state data.

Figure 6:
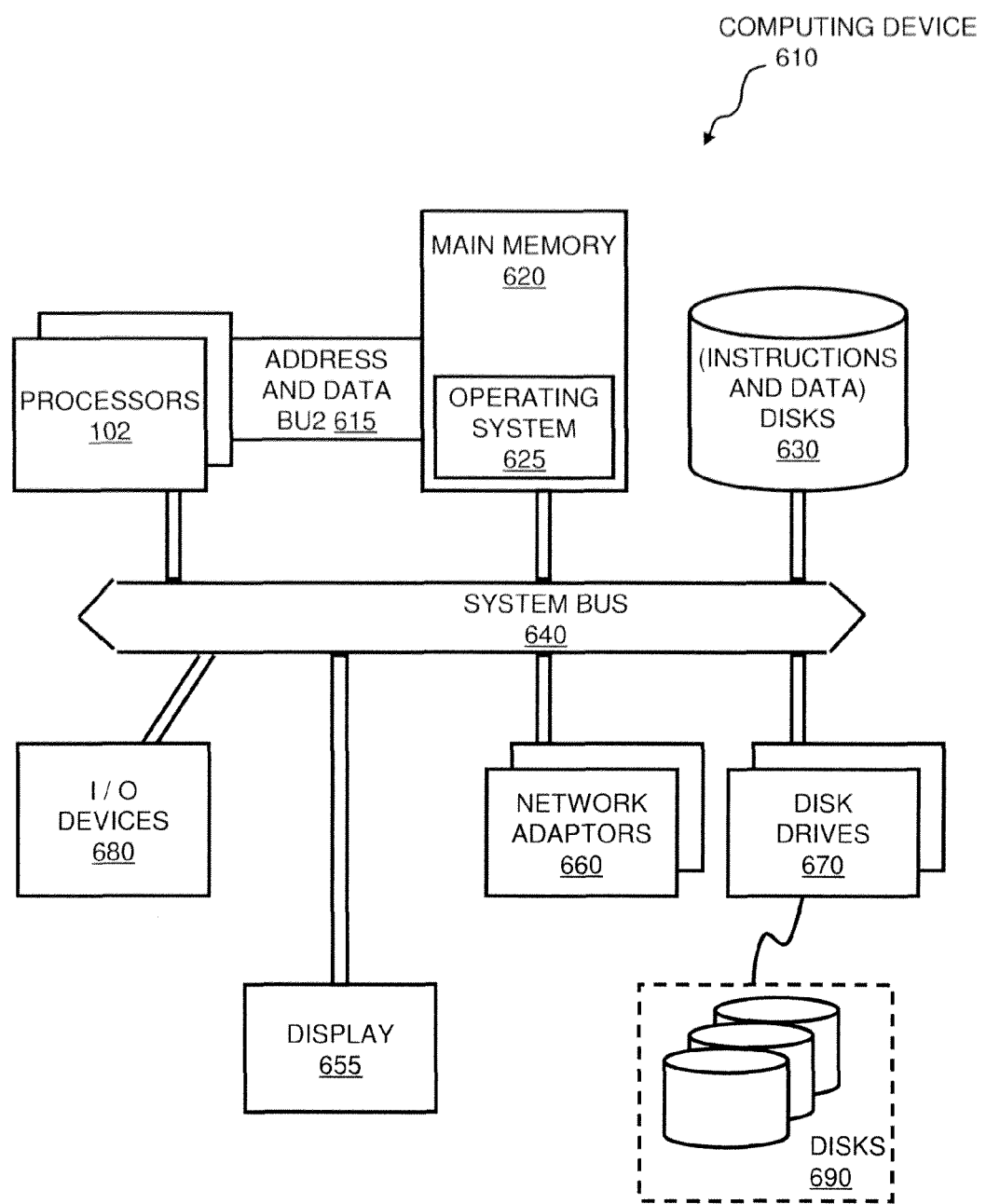
FIG. 6 is a block diagram of a computing device that may be used to implement improved processor core deep power down exit latency by using secondary uninterrupted power supplied to state registers of the processor, according to some embodiments of the present invention.

FIG. 6 is a block diagram of a computing device that may be used to implement improved processor core deep power down exit latency by using secondary uninterrupted power supplied to state registers of the processor, according to some embodiments of the present invention. In some cases, the device of FIG. 6 may provide energy efficient and conserving storing of processor state data so that the processor can use less power and can more quickly enter and exit the deep down power mode. FIG. 6 shows computing device 610 including processor 102 (e.g., die 104), memory 620 having operating system 625, and bus 615. Processor 102 is coupled to memory 620 via bus 615 to process data stored in the memory. Processor 102 is also coupled to disks 630, network adaptors 660, disk drives 670, I/O devices 680 and display 655 by system bus 640. Disks 630, adaptors 660, disk drives 670 and bus 640 may also be housed or installed in device chassis 603. Buses 615 and 640 may communicate signals between the coupled components, using protocols, as know in the art. Certain standard well-known components, which are not germane to embodiments of the invention, may not be shown. I/O devices 680 may include a keyboard and/or mouse interface. Bus 640 is interfaced to display 655 as know in the art.

Processors 102 may be the central processing units (CPUs), and, thus control and coordinate the overall operation of device 610. Processors 102 may accomplish this by executing software, such as the operating system, middleware programs, and applications stored in memory 620. Processors 102 may represent one or more processors or execution cores, as known in the art. Each such processor or core may be controlled by a single unit 140 as described herein. In some cases, multiple processors or cores may be controlled by a single unit 140 as described herein. For example, multiple processors or cores may be controlled by a single unit 140. Alternatively, each of multiple processors or cores may be independently controlled by its own unit 140.

Memory 620 may be or include the "main memory" of device 610. The operating system, middleware programs, and/or applications may be stored in and executed from in memory 620 (e.g., the "software" or machine programmable instructions). Processor 102 has direct access to main memory 620 via an address and data bus 615. Address and data bus 615 may be an address and data bus as know in the art.

Network adapters 660 provide device 610 with the ability to communicate with remote devices, such as remote computers, over a network (e.g., wired or wireless networks) and may be, for example, an Ethernet adapter or Fiber Channel adapter. Network adapters 660 provide device 610 with the ability to communicate with clients or server computers, such as over a local area network (LAN), intranet, the Internet, or various other networks over which data is communicated using wired optical, wireless, acoustical, electromagnetic radiation, or other medium as known in the art.

Disk 630 may contain other instructions and data that are not immediately required by the system in its operations. Disk drives 670 may be one or more devices that allow the computer to access memory or storage disks 150. Disk drives 670 may include a magnetic disk drive, a CD drive, a DVD driver, a USB port or other removable memory interface as known in the art to allow the computer to access memory or storage disks 690.

According to some embodiments, it is contemplated that device 610 may represent a computing device, such as a general purpose computing device and/or special purpose computing device, a desktop computer, a portable computing device, a handheld computing device, a telephone, a cellular telephone, a gaming device, an interim related computing device, a digital video disk (DVD) player, a set top box, etc., and/or another device or system that includes and uses processor 102 to process data.

In some cases, the components of processor 102 (e.g., unit 104) includes hardware logic, hardware, processors, machine executable code, memory, integrated circuits, programmable gate arrays, controllers, buffers, state machines, FPGAs, PLDs, active devices (e.g., transistors, etc.), passive devices (e.g., inductors, capacitors, resistors, etc.), and/or other circuit elements to perform energy efficient thermal throttling of a processor using deep power down mode, according to embodiments of the present invention.

Exemplary Register Architecture

FIG. 7 is a block diagram of a register architecture 700 according to one embodiment of the invention. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers are overlaid on registers xmm0-15.

Write mask registers 715—in the embodiment illustrated, there are 8 write mask registers (k0 through k7), each 64 bits in size. In an alternate embodiment, the write mask registers 715 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif., the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
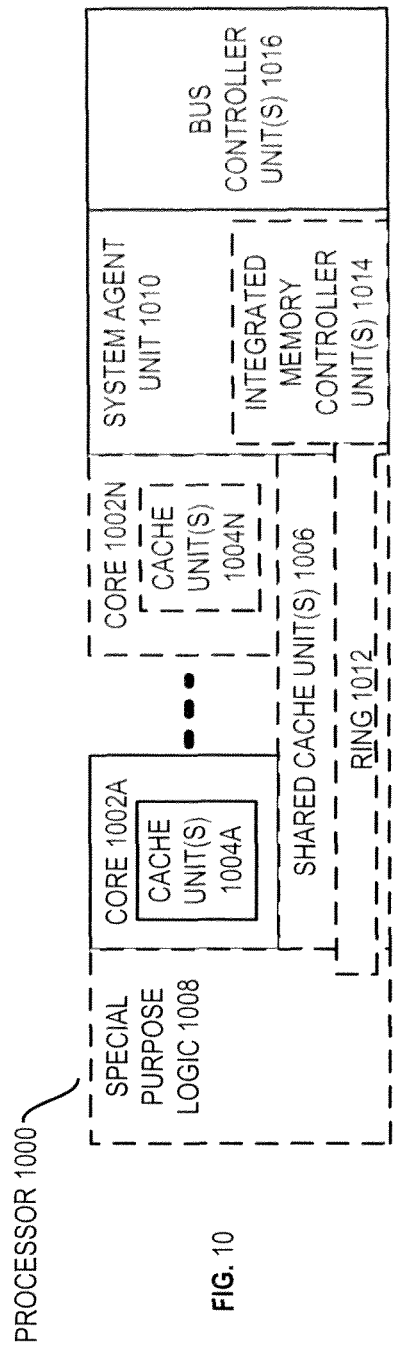
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor. GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
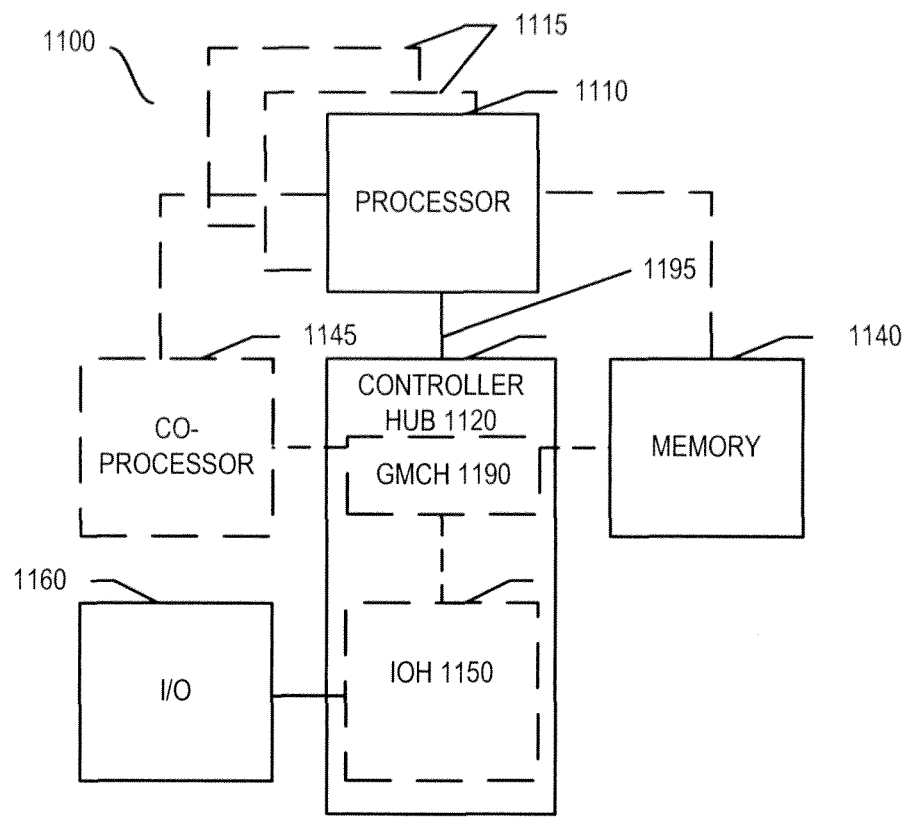
FIG. 11 shows a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller huh 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
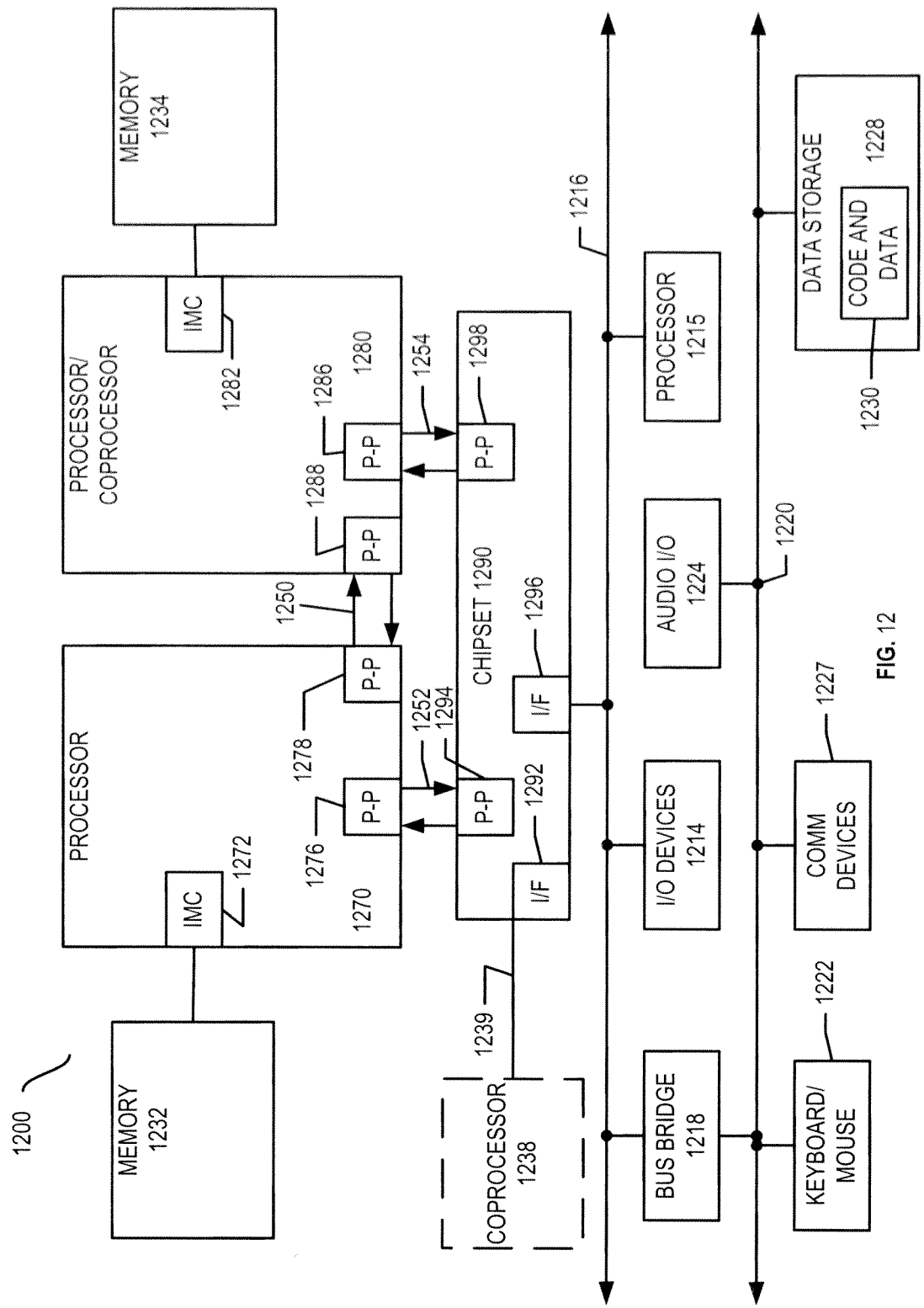
FIG. 12 shows a block diagram of a first more specific exemplary system accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not on limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
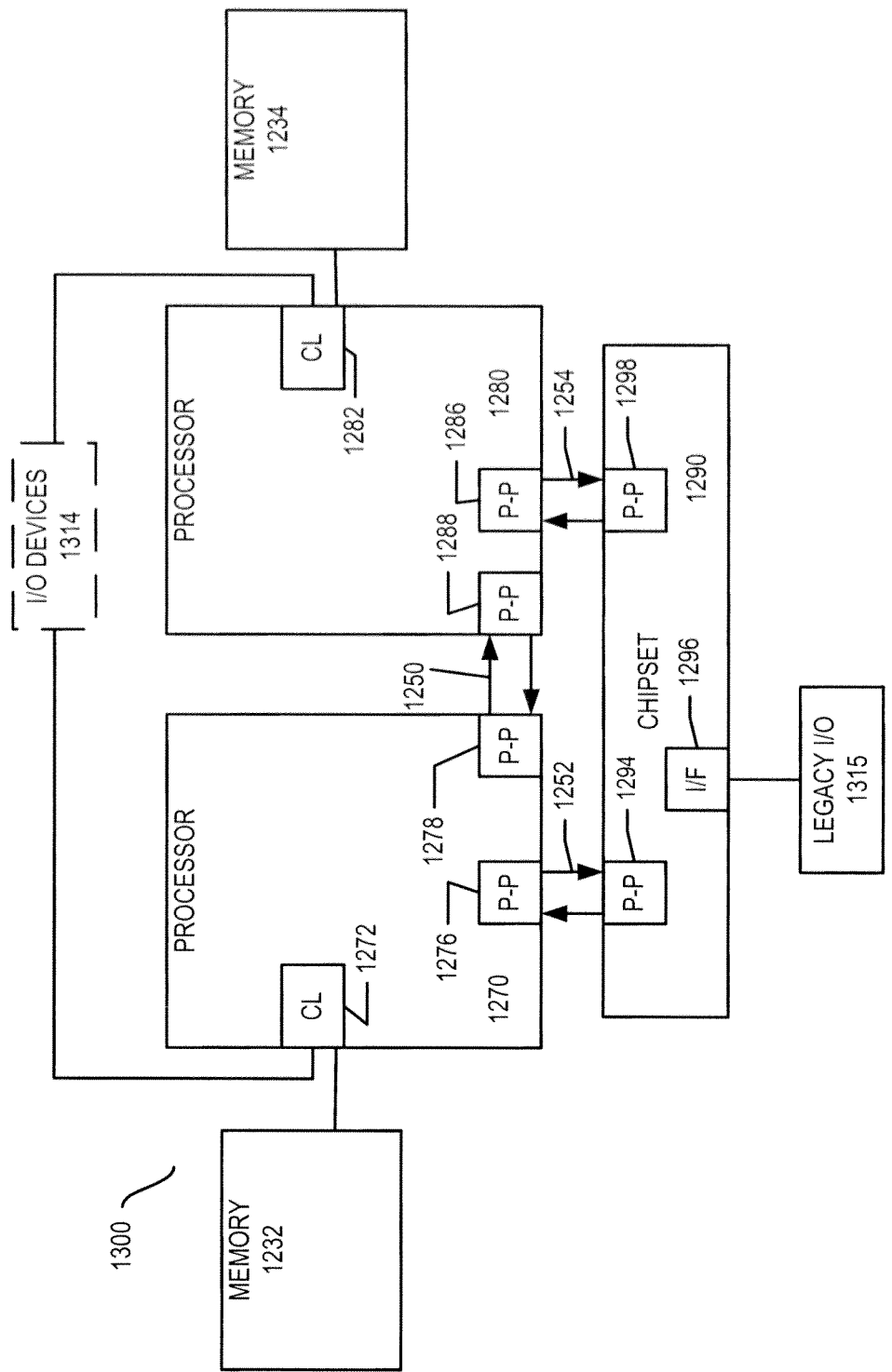
FIG. 13 shows a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
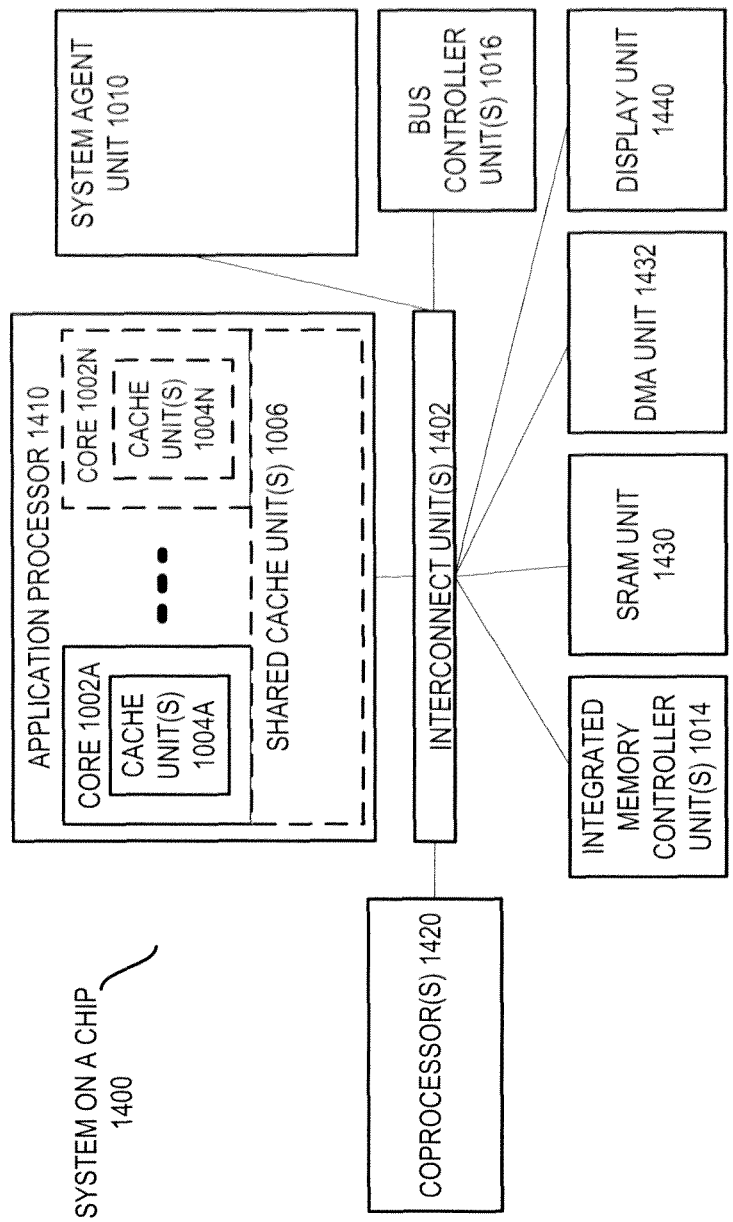
FIG. 14 shows a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g. a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

It will be appreciated that, while exemplary embodiments have been described in reference to providing a secondary uninterrupted voltage supply to maintain processor state data locally, in critical state registers during deep power down mode, that various embodiments may be applied to different types of power control unit, power gates, power supply configurations and/or for different types of integrated circuits. Further, although voltage control, state data storing, and state data transfer are accomplished using signal lines 132, 134, 142, 144, and 146 signals thereon for the exemplary embodiments described herein, other approaches to providing a secondary uninterrupted voltage supply to maintain processor state data locally, in critical state registers are within the scope of various embodiments.

Thus, various embodiments of a method and apparatus for energy efficient and conserving secondary uninterrupted voltage supply to maintain processor state data locally, in critical state registers are described. In the foregoing specification, embodiments of the invention have been described with reference to specific exemplary embodiments thereof. It will, however, be appreciated that various modifications and changes may be made thereto without departing from the broader spirit and scope of embodiments of the invention as set forth in the appended claims. Thus, the specification and drawings are, accordingly, to be regarded in an illustrative rather than a restrictive sense.

What is claimed is:

1. A method comprising:
signaling at least one of a plurality of state registers of a processor that a processor power state of the processor is going to be changed to a zero processor power state from an active processor power state;
based on the signaling, writing data stored as a plurality of state bits of the at least one of plurality of state registers to always on circuitry in the at least one register of the plurality of registers;
changing a processor power state of the processor and of the state bits from the active processor power state to the zero processor power state to reduce power consumption, while maintaining a processor power state of the always on circuitry to maintain the plurality of state data stored in the always on circuitry.

2. The method of claim 1, further comprising;
signaling the plurality of registers that a processor power state of the processor is going to change from the zero power state to an active processor power state;
based on the signaling the plurality of registers that a processor power state of the processor is going to change from the zero power state to an active power state, writing the plurality of state data stored in the always on circuitry to the state bits of the plurality of registers; and
increasing a processor power state of the processor from the zero power state to an active power state.

3. The method of claim 2, wherein changing occurs between 1 and 100 microseconds after signaling;
wherein the plurality of state registers are a predetermined critical state register subset of a total number of possible state registers of the processor, and are between 3 and 15 percent of the total number of state registers of the processor;
wherein each of the plurality of state registers has a always on circuitry to store state data from a corresponding number of the state bits.

4. The method of claim 2, wherein changing comprises turning off power of a first power supply coupled to the processor and to the plurality of state bits, during the zero processor power state; and wherein maintaining comprises maintaining power of a second power supply that is coupled to the always on circuitry, during the zero processor power state.

5. The method of claim 2, wherein writing comprises outputting the plurality of state data stored in the always on circuitry to an execution unit of the processor.

6. The method of claim 2, wherein writing comprises writing the plurality of state data stored in the always on circuitry to the state bits of the plurality of registers, without reading the state data from a volatile memory.

7. The method of claim 1, wherein changing a processor power state of the state bits comprises erasing the plurality of state data stored in the plurality of state bits; and wherein the plurality of state registers comprise flip flops and latches.

8. The method of claim 1 wherein the active processor power state is one of a non-zero power state, and a processor power state equal to or above a thermal design point of the processor; and further comprising:

prior to signaling, the processor processing data while in the active power state.

9. The method of claim 1, wherein writing comprises writing the plurality of state data stored in a plurality of state bits of the plurality of state registers to the corresponding always on circuitry of the plurality of registers, without writing the plurality of state data from the state bits to an external volatile memory.

10. An apparatus comprising:

a processor die comprising a power control unit coupled to an execution unit, the execution unit having a state register having a storage for a number state bits during an active processor power state and separate always on circuitry to store corresponding state data from the state bits during a zero processor power state;

the power control unit configured to signal the state register that a processor power state of the processor is going to be changed from the active processor power state to a zero processor power state;

the state register configured to, based on the signal, write a plurality of state data stored in the plurality of state bits to the corresponding always on circuitry;

the power control unit configured to signal a first power supply of the processor to change a processor power state of the processor and of the state bits from the active processor power state to the zero processor power state;

the power control unit configured to maintain power of a second power supply unit of the processor, during the zero processor power state, to maintain a processor power state of the always on circuitry to maintain the plurality of state data stored in the always on circuitry.

11. The apparatus of claim 10, further comprising:

the power control unit configured to signal the plurality of registers that a processor power state of the processor is going to change from the zero power state to an active power state;

the state register configured to write the plurality of state data stored in the always on circuitry to the corresponding plurality of state bits; and the power control unit configured to, after writing, increase a processor power state of the processor from the zero power state to an active power state.

12. The apparatus of claim 10, wherein the power control unit is configured to signal the first power supply to change the power between 1 and 100 microseconds after signaling the state register;

wherein the state register is a predetermined critical state register subset of a total number of possible state registers of the processor, and is between 3 and 15 percent of the total number of state registers of the processor.

13. The apparatus of claim 10, wherein the power control unit is configured to signal the first power supply to turn off power to the processor and to the plurality of state bits, during the zero processor power state; and wherein the power control unit is configured to maintain power of the second power supply to maintain power to the always on circuitry, during the active processor power state.

14. The apparatus of claim 11, wherein writing comprises the always on circuitry outputting the plurality of state data to the execution unit of the processor.

15. The apparatus of claim 11, wherein changing a processor power state of the state bits comprises the state register erasing the plurality of state data stored in the plurality of state bits; and wherein the of state register comprise a flip flops and/or latch.

16. The apparatus of claim 11, wherein the active processor power state is one of a non-zero power state, and a processor power state equal to or above a thermal design point of the processor; and further comprising:

the processor configured to process data while in the active power state, based on a processor state identified by the plurality of state bits.

17. The apparatus of claim 10, wherein the plurality of state bits are predetermined to include state bits required to define a state of the processor necessary for the processor to process data for an operating system and for an application running on that operating system.

18. A system comprising:

memory to store a program;

a processor die coupled to the memory to process data stored in the memory;

a processor die comprising a power control unit coupled to an execution unit, the execution unit having a state register having a storage for a number state bits during an active processor power state and separate always on circuitry to store corresponding state data from the state bits during a zero processor power state;

the power control unit configured to signal the state register that a processor power state of the processor is going to be changed from an active processor power state to a zero processor power state;

the state register configured to, based on the signal, write a plurality of state data stored in the plurality of state bits to the corresponding always on circuitry;

the power control unit configured to signal a first power supply of the processor to change a processor power state of the processor and of the state bits from the active processor power state to the zero processor power state;

the power control unit configured to maintain power of a second power supply unit of the processor, during the zero processor power state, to maintain a processor power state of the always on circuitry to maintain the plurality of state data stored in the always on circuitry.

19. The system of claim 18, further comprising:

the power control unit configured to signal the plurality of registers that a processor power state of the processor is going to change from the zero power state to an active power state;

the state register configured to write the plurality of state data stored in the always on circuitry to the corresponding plurality of state bits; and the power control unit configured to, after writing, increase a processor power state of the processor from the zero power state to an active power state.

20. The system of claim 19, wherein the state register is a predetermined critical state register subset of a total number of possible state registers of the processor, and is between 3 and 15 percent of the total number of state registers of the processor; and further comprising:

the plurality of registers configured to, based on the signal, write the plurality of state data stored in the plurality of state bits to the plurality of corresponding always on circuitry, without writing the plurality of state data from the state bits to the memory; and the execution unit configured to write the state data from the always on circuitry to the plurality of state bits, without reading the state data from the memory.

\* \* \* \* \*